United States Patent
Øygard et al.

(10) Patent No.: US 12,242,856 B2
(45) Date of Patent: Mar. 4, 2025

(54) DATA PROCESSORS

(71) Applicant: Arm Limited, Cambridge (GB)

(72) Inventors: Tord Kvestad Øygard, Troms og Finnmark (NO); Olof Henrik Uhrenholt, Lomma (SE); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/656,346

(22) Filed: Mar. 24, 2022

(65) Prior Publication Data

US 2022/0308884 A1 Sep. 29, 2022

(30) Foreign Application Priority Data

Mar. 29, 2021 (GB) ..................................... 2104432

(51) Int. Cl.
*G06F 9/38* (2018.01)
(52) U.S. Cl.
CPC .......... *G06F 9/3836* (2013.01); *G06F 9/3851* (2013.01); *G06F 9/3888* (2023.08)
(58) Field of Classification Search
CPC .................................................... G06F 9/3836
See application file for complete search history.

(56) References Cited

U.S. PATENT DOCUMENTS

| | | | | |
|---|---|---|---|---|
| 2005/0210204 A1* | 9/2005 | Yamazaki | ........... | G06F 12/0815 711/120 |
| 2013/0124826 A1* | 5/2013 | Merchant | .............. | G06F 9/3851 712/205 |
| 2013/0166877 A1* | 6/2013 | Choquette | ............. | G06F 9/3012 712/E9.023 |
| 2016/0132338 A1* | 5/2016 | Jin | ...................... | G06F 9/30058 712/206 |
| 2018/0107598 A1* | 4/2018 | Prodromou | ......... | G06F 12/0811 |
| 2018/0181398 A1 | 6/2018 | Scherbinin et al. | | |
| 2018/0276046 A1 | 9/2018 | Joao et al. | | |
| 2019/0104178 A1* | 4/2019 | Sukhomlinov | ....... | G06F 9/5077 |

(Continued)

FOREIGN PATENT DOCUMENTS

WO  2004044745 A1  5/2004

OTHER PUBLICATIONS

Rogers, T.R., et al., "Learning Your Limit: Managing Massively Multithreaded Caches Through Scheduling", Communications of the ACM, Dec. 2014, vol. 57, No. 12, pp. 91-98.

(Continued)

*Primary Examiner* — Michael J Metzger
(74) *Attorney, Agent, or Firm* — Pearl Cohen Zedek Latzer Baratz LLP

(57) ABSTRACT

A data processor comprising an execution engine 51 for executing programs for execution threads and one or more caches 48, 49 operable to store data values for use when executing program instructions to perform processing operations for execution threads. The data processor further comprises a thread throttling control unit 54 configured to monitor the operation of the caches 48, 49 during execution of programs for execution threads, and to control the issuing of instructions for execution threads to the execution engine for executing a program based on the monitoring of the operation of the caches during execution of the program.

20 Claims, 6 Drawing Sheets

(56) References Cited

U.S. PATENT DOCUMENTS

2022/0179787 A1* 6/2022 Koker .................. G06F 7/5443

OTHER PUBLICATIONS

Rogers, T.R., et al., "Cache-Conscious Wavefront Scheduling", 47th Annual IEEE/ACM International Symposium on Microarchitecure, 2012, pp. 1-12.
Combined Search and Examination Report dated Dec. 21, GB Patent Application No. GB2104432.6.
Kim, H., et al., "Complier-Assisted GPU Thread Throttling for Reduced Cache Contention", Proceeding of the 48th International Conference on Parallel Processing, 2019, pp. 1-10.

* cited by examiner

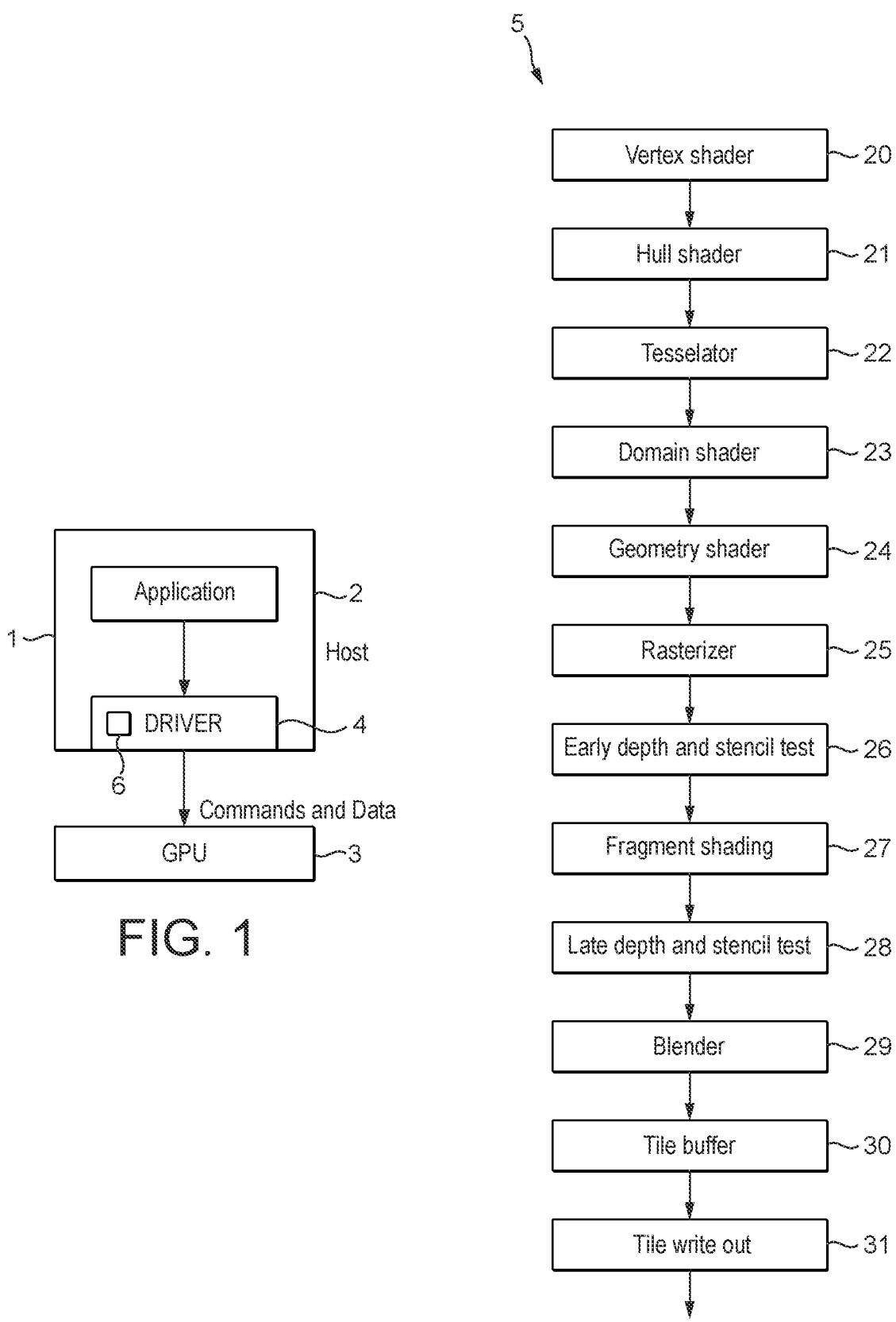

DATA PROCESSORS

CROSS-REFERENCE TO RELATED APPLICATIONS

This application claims priority pursuant to 35 U.S.C. 119(a) to United Kingdom Patent Application No. 2104432.6, filed Mar. 29, 2021, which application is incorporated herein by reference in its entirety.

BACKGROUND

The technology described herein relates to data processors and in particular to data processors that use caches to store data, etc., locally to a processing unit or units, e.g. so as to reduce the need to fetch data from slower data stores, such as main memory of a data processing system that the data processor is part of.

In such arrangements, when data is required for a processing operation, it will be first determined whether the data is available in the appropriate cache (a cache "lookup"). If the data is not present in the cache (there is a cache "miss"), the data will first be fetched from its associated data store, e.g. in main memory, into the cache, with the processing operation being stalled until the relevant data is available in the cache.

On the other hand, if the data is already present in the cache (there is a cache "hit"), the data can then be read from the cache, rather than from the main data store where it is stored, thereby allowing the processing operation to proceed more rapidly.

Such arrangements can work well to reduce latency and/or improve throughput within a data processor.

Many data processors execute program instructions to perform processing operations. An example of this is a graphics processor (graphics processing unit (GPU)) that executes a graphics processing pipeline that includes one or more programmable processing stages ("shaders"). For example, a graphics processing pipeline being executed by a graphics processor may include one or more of, and typically all of: a geometry shader, a vertex shader and a fragment (pixel) shader. These shaders are programmable processing stages that execute shader programs on input data values to generate a desired set of output data, such as appropriately shaded and rendered fragment data in the case of a fragment shader, for processing by the rest of the graphics processing pipeline and/or for output.

In graphics shader operation, each graphics work "item" in a graphics output, such as a render target, e.g. frame, to be generated (an "item" in this regard is usually a vertex or a sampling position (e.g. in the case of a fragment shader)) will be processed by means of an execution thread which will execute the instructions in the shader program in question for the graphics work "item" in question.

In order to execute shader programs, a graphics processor (graphics processing unit (GPU)) will include an appropriate execution unit or units (circuit or circuits) for that purpose. The execution unit(s) will include programmable processing circuit(s) for executing shader programs (the "shaders" of graphics processing pipeline).

The actual data processing operations that are performed by the shader execution unit when executing a shader program may be performed by respective functional units (circuits), such as arithmetic units (circuits), of the execution unit, in response to, and under the control of, the instructions in the (shader) program being executed. Thus, for example, appropriate functional units, such as arithmetic units, will perform data processing operations in response to and as required by instructions in a (shader) program being executed.

The graphics processor may also include one or more "accelerators" (processing units), such as a varying interpolator, a texture mapper and a blender, that perform specific processing operations, such as varying interpolation, texture mapping and blending, under the control of the programmable execution unit (and again in response to and as required by instructions in a program being executed).

When executing an instruction in a program, the execution unit (e.g. the appropriate functional unit, such as an arithmetic unit, of the execution unit), and/or an accelerator associated with the execution unit, will typically read one or more input data values (operands), perform a processing operation using those input data values to generate an output data value, and then return the output data value, e.g. for further processing by subsequent instructions in the program being executed and/or for output (for use otherwise than during execution of the program being executed).

The input data values to be used when executing the instructions will typically be stored in a cache or caches accessible to the execution unit and/or accelerator(s), and the output data value(s) generated by the execution unit and/or accelerator(s) when executing the instruction will correspondingly be written back to an appropriate cache, for future use. Thus when executing an instruction, input data values (operands) will be read from an appropriate cache or caches, and output value(s) written back to that or a different cache.

In the case of a graphics processor, for example, there may be a "load/store" cache intended for storing data for processing operations generally, but there may also be one or more other caches intended and used for storing data of a particular type or types, such as a texture cache for storing texture data for texture mapping operations.

The Applicants believe that there remains scope for improvements to the operation of data processors that use caches to store data when executing instructions to perform processing operations.

BRIEF DESCRIPTION OF THE DRAWINGS

Various embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
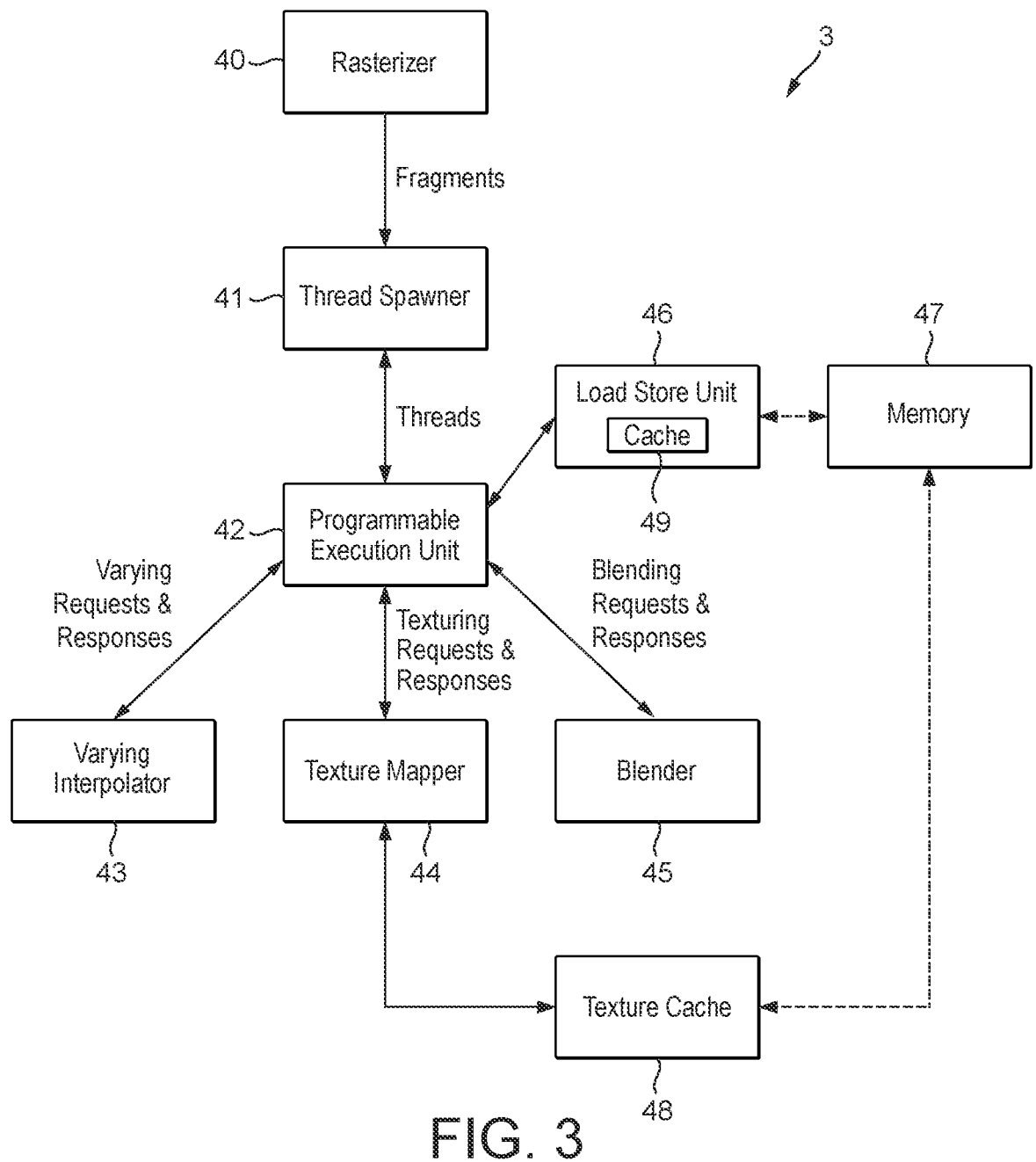
FIG. 3 shows schematically a graphics processor.

In an embodiment, the technology described herein comprises a method of operating a data processor in which execution threads may execute program instructions to perform processing operations, the data processor comprising:

an execution unit operable to execute instructions in a program to be executed to perform processing operations for execution threads executing the program; and a cache operable to store data values when executing instructions to perform processing operations for execution threads;

the method comprising:

when the execution unit is executing a program comprising a set of one or more instructions for a plurality of execution threads:

monitoring the operation of the cache during execution of the program for the plurality of execution threads; and controlling the issuing of instructions for execution threads of the plurality of execution threads to the execution unit for executing the program based on the monitoring of the operation of the cache during execution of the program for the plurality of execution threads.

In an embodiment of the technology described herein comprises a data processor in which execution threads may execute program instructions to perform processing operations, the data processor comprising:

an execution unit operable to execute instructions in a program to be executed to perform processing operations for execution threads executing the program;

a cache operable to store data values when executing instructions to perform processing operations for execution threads;

a cache operation monitoring circuit configured to monitor the operation of the cache during execution of a program for a plurality of execution; and an execution thread issuing controller configured to control the issuing of instructions for execution threads to the execution unit for executing a program based on the monitoring of the operation of the cache during execution of a program by the cache operation monitoring circuit.

The technology described herein relates to the operation of a data processor when executing a program for plural execution threads and using a cache to store data when executing the program.

In the technology described herein, the operation of the cache when a program is being executed by plural execution threads is monitored, and the issuing of instructions for threads to the execution unit to execute a program is controlled based on the monitoring of the cache operation. In other words, "feedback" from the current operation condition of the cache is used to control the issuing of instructions for execution threads for execution.

The Applicants have recognised in this regard that when executing a program for a plurality of execution threads, a situation commonly referred to as "cache thrashing", in which multiple main memory locations compete for the same cache lines, thereby resulting in excessive cache misses, can arise. This can then have a severe impact on performance and energy usage, for example.

This may in particular be the case where the "working set" for the current program/workload being executed is larger than the cache capacity. Moreover, in some situations and/or for some workloads, it may not be possible to reasonably predict the working set size ahead of time (to thereby, e.g., allow other preventative measures to be taken). For example, this can be a relatively common occurrence for graphics processors, where it is often not possible to predict the size of the working set for the caches when running graphics (or other) workloads.

The technology described herein addresses this by monitoring the cache operation in use and controlling the issuing of instructions for execution threads for processing accordingly. In particular, and as will be discussed in more detail below, the technology described herein can, and in an embodiment does, restrict (throttle) the number of threads for which instructions are issued for execution when a risk of cache thrashing is identified, thereby helping to avoid cache thrashing occurring.

Thus the technology described herein can reduce or avoid cache thrashing, even where the size of the working set (and thus the likelihood of cache thrashing arising) cannot be predicted in advance.

The data processor can be any desired and suitable data processor that can execute program instructions. In general the data processor is in an embodiment a multithreaded data processor, such as a graphics processor, a vector processor, a DSP or a CPU. In an embodiment, the data processor is a graphics processor (graphics processing unit (GPU)).

The operation in the manner of the technology described herein may be performed for any suitable and desired program that is to be executed by the data processor. In the case of a graphics processor, the program may be, and is in an embodiment, a (graphics) shader program. The program may be, for example, a geometry shader program (a program for executing geometry shading operations), a tessellation shader (a program for executing tessellation shading operations), a vertex shader program (a program for executing vertex shading operations), a fragment shader program (a program for executing fragment shading operations), or a compute shader (e.g. according to OpenCL or DirectCompute).

The program will comprise a sequence of instructions to be executed. The set (sequence) of instructions being executed for the program can be any desired and suitable instructions. As will be discussed further below, the data processor may be executing plural programs at the same time, and can in an embodiment control the issuing of instructions for execution threads for one, or plural, or all, of the plural programs based on the cache operation conditions, as desired.

In an embodiment, the technology described herein is used for and when the data processor (the execution unit of the data processor) is executing a (programmable) processing stage of a data processing pipeline. In this case therefore, the execution unit will be executing a program (a set of instructions) to perform processing operations of a (programmable) processing stage of a data processing pipeline.

In the case of a graphics processor executing a graphics processing pipeline, the programmable processing stage in an embodiment comprises a programmable shading stage (shader). The programmable processing stage that the program is executing may, for example, be a geometry shading stage (geometry shader), a vertex shading stage (vertex shader), a tessellation shading stage (a tessellation shader), or a fragment shading stage (fragment shader).

The operation in the manner of the technology described herein can be, and is in an embodiment, used for plural processing stages of a data processing pipeline (where the pipeline comprises plural programmable processing stages). In an embodiment the operation in the manner of the technology described herein is used for all (programmable) processing stages that the data processor, e.g. graphics processor, may be required to execute.

The operation in the manner of the technology described herein may be performed by and for each and every program and/or (programmable) processing stage that the data processor executes, or only for particular categories or types of program or processing stage but not for other categories or types of program or processing stage, e.g., as desired and as appropriate.

The data processor may comprise a single execution unit, or may have plural execution units. Where there are a plural execution units, each execution unit can in an embodiment operate in the manner of the technology described herein.

Where there are plural execution units, each execution unit may have its own cache or caches, or there may be a cache or caches shared between plural (e.g. some or all) of the separate execution units.

Where there are plural execution units, each execution unit may be provided as a separate circuit to other execution units of the data processor, or the execution units may share some or all of their circuits (circuit elements).

The or each execution unit may, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform (data) processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store type units (such as blend or store units), etc.

The functional units can be implemented as desired and in any suitable manner. They will comprise (be implemented as) suitable hardware elements such as processing circuits (logic).

An (the) execution unit may, for example, comprise plural sets of functional units, with each set of functional units performing a particular, and, e.g., different, form of operation. For example, there may be a set of functional units (pipeline) for performing arithmetic operations (an arithmetic pipe) (and comprising, inter alia, arithmetic units), another set of functional units that performs loads/store operations (a load/store pipe) (and comprising, inter alia, load and/or store type functional units), and so on.

Where an execution unit has plural sets of functional units (pipelines), then each set of functional units may have its own cache or caches, or there may be a cache or caches shared between plural (e.g. some or all) of the separate sets of functional units.

In an embodiment, all the sets of functional units have access to the (same) (shared) cache or caches for the execution unit.

The data processor in an embodiment also comprises any other appropriate and desired units and circuits required for the operation of the execution unit(s), such as appropriate control circuits (control logic) for controlling the execution unit(s) to cause and to perform the desired and appropriate processing operations. In an embodiment, the data processor comprises one or more of, and in an embodiment all of: an instruction decode circuit or circuits operable to decode instructions to be executed so as to cause the execution unit(s) to execute the required instructions; an instruction fetch circuit or circuits operable to fetch instructions to be executed (prior to the decode circuit(s)); an instruction cache; and an execution thread generator and scheduler (spawner) that generates (spawns) threads for execution.

In an embodiment, the data processor also includes one or more accelerators (special purpose units (circuits)) that are configured to perform specific processing operations, under the control of the execution unit.

These accelerators are in an embodiment fixed function units (i.e. hardware that is configured to perform the specific operations in question). However, they could also be completely or at least in part programmable units, e.g. that are operable to execute program instructions to perform the relevant processing operations, if desired.

In the case of a graphics processor at least, such accelerators in an embodiment comprise one or more of, and in an embodiment all of: a varying interpolation unit (varying interpolator), a texture mapping unit (texture mapper), a load/store unit, and a blending unit (blender). Other accelerators (special purpose units) may include an arithmetic unit or units (such as a floating point matrix multiplier), etc., if desired.

The execution unit can in an embodiment communicate with the accelerator(s) of the data processor. Such communication in an embodiment comprises being able to send messages to the accelerator(s) to trigger their processing operations, and being able to receive the corresponding responses from the accelerator(s).

Correspondingly, the accelerator(s) are in an embodiment configured to perform processing operations in response to messages received from the execution unit, and to return appropriate responses to the execution unit.

A (and each) accelerator may have its own cache or caches, or there may be a cache or caches shared between plural (e.g. some or all) of the accelerators. Equally there may be a cache or caches that are provided specifically for (dedicated to) an accelerator or accelerators, or the accelerator(s) may also or instead share a cache or caches with other units, such as the (functional units of) the execution unit.

The cache whose operation is monitored in the manner of the technology described herein may be any suitable and desired cache that is configured to store data values for use when (the execution unit is) executing program instructions to perform processing operations for execution threads. There may only be a single cache in this regard, or there may be plural caches. The cache(s) can store any suitable and desired data for use by the data processor.

In an embodiment, the data processor has, and there are, plural caches that are monitored and operated in the manner of the technology described herein. In this case, the different caches may all store the same type(s) of data and/or be for the same functional units/accelerators or they may be for different types of data and/or be for different functional units/accelerators, etc.

In an embodiment there is a cache for storing data generally and one or more other caches used for a particular type of data (e.g., and in an embodiment, that is used by a particular accelerator or accelerators). For example, and in an embodiment, there may be a "general" load/store cache and one or more "data-specific" caches (e.g., and in an embodiment, in the case of a graphic processor, a texture cache (storing graphics texture data)). Other caches that the technology described herein is in an embodiment used for would be translation lookaside buffers (TLBs) that store memory address translations (mappings).

Thus, in an embodiment, the technology described herein is used for and in relation to one or more, and in an embodiment all, of the following caches: a load/store cache; a texture cache (in the case of a graphics processor); and a translation lookaside buffer (memory address translation cache). It could also instead be used for other types of cache as well, if desired. For example, the technology described herein could also be used for "non-specialised" caches, such as generic, e.g. L1 and/or L2, caches (and which may or may not live on the miss path of more specialised caches, such as a texture cache or load/store cache).

The cache or caches will store (cache) data from and/or for storing in appropriate memory (a memory system) of or accessible to the data processor. Thus the cache or caches will be arranged between the memory system and the data processor and be operable to transfer data stored in the memory system to the data processor for use thereby during a data processing operation and/or be operable to transfer data stored in the cache by the data processor during a data processing operation to the memory system.

It should be noted in this regard that the technology described herein can be, and is in an embodiment, used in relation to, and monitors, both read and write events (transactions) to the cache, i.e. both the operation in which data is fetched into the cache for use when executing instructions to perform processing operations for execution threads, and when data is written to the cache (for then writing to the memory) when executing instructions to perform processing operations for execution threads. Thus, the cache may be operating to store data values for use when executing instructions for processing operations for execution threads, and/or operating to store data values generated when executing instructions to perform processing operations for execution threads (for then writing to memory).

The technology described herein could be used in respect of (and monitor) only cache read transactions or only cache write transactions, but in an embodiment is used in respect of and monitors both read and write transactions to the cache (where the cache is used for both read and write transactions). In the case where the cache is a read only cache or a write only cache, then the technology described herein will be applied to and used for and monitor the respective read or write operations, as appropriate.

The data processor correspondingly in an embodiment has an appropriate interface to, and communication with, such as a load/store pipe, the memory (system) of or accessible to the data processor, for loading data values from memory into the cache or caches and writing data values from the cache or caches to the memory. There may be an appropriate cache system (hierarchy) between the memory (system) and the caches that are operated in the manner of the technology described herein.

The memory (memory system) that the cache or caches interface with may comprise any suitable and desired memory and memory system of the overall data processing system that the data processor is part of, such as, and in an embodiment, a main memory for the data processor (e.g. where there is a separate memory system for the data processor), or a main memory of the data processing system that is shared with other elements, such as a host processor (CPU), of the data processing system. Other arrangements would, of course, be possible.

Subject to any requirements for operation in the manner of the technology described herein, the cache or caches may otherwise be configured and operate as desired, such as, and in an embodiment in the normal manner for caches in the data processor and data processing system in question. Thus the cache(s) may have any desired and suitable number of cache lines, use any suitable and desired eviction (replacement) policy, any suitable and desired "miss" handling operation, etc.

In the technology described herein, the operation of a cache or caches is monitored during execution of a program for a plurality of execution threads. This monitoring should, and in an embodiment does, monitor the performance of the cache, and, in particular, and in an embodiment, the utilisation of the cache. In an embodiment the monitoring is so as to provide an indication of whether cache thrashing is occurring and/or likely to occur (an indication of a likelihood of cache thrashing occurring).

As discussed above, in an embodiment both read and write transactions (events) to the cache or caches are monitored (unless the cache is a read only or write only cache).

Where the operation of plural caches is being monitored, then in an embodiment, each cache is monitored independently of the other caches (so has its own "performance metric" indicative of a likelihood of thrashing for example (and in an embodiment)), but it would be possible to also or instead monitor the operation of plural caches together (collectively), if desired.

The monitoring of a cache can monitor any suitable and desired aspects of the cache operation (performance), e.g., and in an embodiment, that can be used as an indication of whether the cache thrashing is likely to occur or not. In an embodiment an aspect or aspects of the cache operation that are indicative of the "pressure" on the cache (with higher pressure signifying a greater likelihood of and/or the existence of cache thrashing) are monitored.

In an embodiment, one or more, and in an embodiment plural, (performance) (pressure) metrics for the cache are monitored (tracked), and then used to determine if cache thrashing is likely to occur or not, for example, and in an embodiment, by comparing the metrics (or some combination of the metrics or derived measure from the metrics) to a threshold or thresholds.

In this case, the cache metrics that are monitored (measured) are in an embodiment metrics that are indicative of the utilisation of the cache, and in an embodiment that are indicative of the "pressure" on the cache. Any suitable and desired metrics can be used in this regard.

In an embodiment, a (running) average value for the metric in question is determined (and tracked). This average could be with respect to time (a temporal average) or with respect to the number of cache events (e.g. transactions and/or lookups). In an embodiment one or more of the metrics uses a temporal average (such as, and in an embodiment, an average per cycle or per particular number of cycles), and one or more other metrics are averaged with respect to the number of cache events. In an embodiment, at least one of the metrics uses a temporal average, as that should then help to avoid deadlocks arising in the case where no cache transactions are actually proceeding.

To simplify the determination/tracking of averages, in an embodiment a separate average is determined (and maintained) for each of the numerator and denominator for the metric in question. In an embodiment a separate average is maintained for each metric that is being considered.

The averages for the metrics can be measured over any suitable period (e.g. time period, e.g. number of cycles, or number of cache events, as appropriate), and may be updated at any suitable and desired rate (after any desired and suitable interval, e.g. in terms of a given number of cycles or number of cache events, as appropriate).

In an embodiment, the averages are updated every N, where N is an integer greater than one, cycles/events (as appropriate), and in an embodiment every 16-64, more in an embodiment every 32, cycles/events.

It would be possible in this regard simply to update the average for a metric every N cycles/events (and in an embodiment, that is what is done). In an embodiment, a "full" determination of the average for the metric is performed every N cycles/events, but in between those "full" update determinations, a less accurate, estimated update is performed. For example, a less accurate, estimated update could be performed for every cycle/event, but with a more accurately determined update being done every N cycles/events. For the less accurate updates, an estimate based, for example, on the effect an increase or decrease in the number of threads/thread groups (in flight) could, for example, and in an embodiment, be used (e.g. based on an assumption that adding or removing a single thread/thread group in a cycle, for example, will have a particular impact on the cache performance metric in question). Other arrangements would, of course, be possible.

In an embodiment, the average of a cache performance metric (when (fully) updated) is determined as a weighted combination of the current average for the metric and a newly measured value for the metric, and in an embodiment as:

updated_value=(current_value×(1.0−filter_constant))+(incoming_value×(filter_constant))

where current_value is the current average of the cache performance metric; incoming_value is the new measure of that metric; updated_value is the updated average for the metric; and filter_constant is a weighting value (that determines what contribution the incoming_value makes to the updated average).

The new measure of the metric (incoming_value) that is used when (fully) updating the average of a cache performance metric in this manner could simply be a, e.g. latest, measure of the metric. In an embodiment it is an average of the value for the metric since the last "full" update. Thus where, for example, a "full" update is done every 32 cycles, the new value (incoming_value) used for a "full" update is in an embodiment the average value for the metric over the 32 cycles since the previous "full" update.

The weighting (filter constant) applied to the new value for metric is in an embodiment in the range 0.01 to 0.0001.

It would be possible in this regard for the relative weighting of the current average for the metric and of the new value for the metric when determining the updated average for the metric to be fixed (predefined), but in an embodiment, the relative weighting can be, and is in an embodiment, varied in use.

In an embodiment, the relative weighting used when determining the averages for the performance metrics is based on (and updated based on) a measure of the size (footprint) of a program that the threads are executing, and in particular, and in an embodiment, on the average thread lifetime when executing a program.

Thus, in an embodiment, the relative weighting used when determining the averages for the performance metrics is based on (and is updated based on) the size of the program being executed. In an embodiment the weighting for new metric value (incoming_value) is set to be smaller the greater the size of the program (and vice versa).

The size (footprint) of the program in this regard could be indicated and measured in any suitable and desired manner. For example, it could comprise an overall instruction count for the program (either statically determined (e.g. at compile time) or dynamically determined by measuring/averaging the overall instruction count at run time); a cache instruction count (number of instructions using any of the caches being monitored); and a cache event count (which is in an embodiment monitored dynamically, by measuring/averaging the count at run time).

In general, the size of the program could be statically determined upfront (e.g. as some function of the instructions of the program that can be evaluated without running the program) and/or dynamically measured at run time (e.g. by running the program and seeing how long it is), with the latter being preferred.

In an embodiment, the size of the program in terms of the average thread/thread group lifetime, in an embodiment in cycles (of active threads/thread groups using the cache in question), is considered and used for this. In this case, the average thread/thread group lifetime (cycles) of all thread/thread groups using the cache is in an embodiment considered and used for this purpose, irrespective of the program that the thread/thread groups using the cache are executing (and in an embodiment similarly for other measures of program "size").

Most in an embodiment, the weighting (the filter constant) for the new value for the metric when determining the average is relatively greater for relatively smaller programs (shorter thread lifetimes) as compared to for larger programs (longer thread lifetimes). Thus, the relative weighting for the new value of the metric (incoming_value) when determining the average for a metric is in an embodiment inversely proportional to the (average) thread life time.

This will then help to avoid excessive oscillations in the averages being taken in the case of relatively larger programs (longer thread lifetimes), whilst correspondingly facilitating the averages reaching a steady state in the case of shorter programs (shorter thread lifetimes).

The program size (footprint) (e.g. thread/thread group lifetime) could be provided to the cache operation monitoring process (circuit), e.g. as meta-data relating to the program being executed (e.g. be provided by the compiler and/or the application programmer, and passed to the cache operation monitoring process/circuit as a descriptor(s)), and/or determined dynamically, in use, e.g. by the execution unit counting executed instructions. In an embodiment, a combination of these processes is used, with an initial indication of the program size (footprint) being provided initially, but which is then updated by monitoring the operation of threads/thread groups that are executing the program.

Correspondingly, an appropriate measure of the (e.g. average) thread lifetime for threads executing the program may be maintained and tracked and provided to the cache operation monitoring process/circuit as appropriate.

It would be possible to use the same update rate and/or relative weighting for each metric being monitored, but in an embodiment the rate at which the average is updated and/or the relative weighting can be, and is in an embodiment, different for each metric that is being considered.

It would also be possible, if desired, to set and vary the rate at which the averages are updated and/or the relative weighting used for the averages based on other criteria or conditions, if desired. For example, the average for one metric could be varied in use based on a measure of another cache performance metric, if desired.

As discussed above, in embodiments while a "full" update of the average for a cache metric is performed periodically, in between those "full" updates, in an embodiment some less accurate estimate is done to update the metric. In this case, the estimate for the metric is in an embodiment incremented or decremented, in an embodiment by a particular, in an embodiment selected, amount, depending upon how the number of (active) threads/thread groups changes in a cycle or cycles.

In an embodiment, one or more of, and in an embodiment all of, the following metrics are monitored for a cache: a measure of the cache tag re-allocation rate (i.e. how often the same tag is allocated in the cache (this will indicate whether the same data is being allocated in the cache a lot)); a measure of the number of cache lines being (line) filled at the current point in time (this will indicate whether the cache is currently "always" loading data or not); and a measure of the miss rate for the cache (this will provide an indication of how efficiently the cache is working).

It will be appreciated that the combination of these metrics will provide an indication of the "pressure" the cache is currently under and whether thrashing is occurring or likely to occur (as they effectively provide an indication of whether the cache is, e.g. doing a lot of data fetching (and of data that has already been fetched before), and/or whether the cache is, e.g., effectively providing the data needed for processing operations to the data processor).

The cache tag reallocation rate can be measured in any suitable and desired manner. The cache tags whose reallocation rate is checked can comprise any suitable and desired "tags" that are used to identify data in the cache. Thus they may, for example, comprise memory addresses, but they can also comprise other forms of tag where cache lines are tagged with identifiers other than memory addresses, as appropriate.

The cache tag reallocation rate could track allocations relating to the fetching of data into the cache only (and in one embodiment that is the case), but in an embodiment, all allocations of cache lines (i.e. for both reads and writes) are tracked and considered for the purposes of this metric.

In an embodiment, a Bloom filter is used to keep track of the cache tag reallocation rate. Thus, for example, and in an embodiment, cache tags are used to populate and checked against a Bloom filter that records previously used tags.

There should be, and is in an embodiment, a defined mapping from (allocated) cache lines to what is tracked by the Bloom filter. Thus, the Bloom filter may, for example, record cache tags, such as memory addresses, or derivatives thereof (such as a hash). There may be one Bloom filter per cache, or a shared Bloom filter that tracks plural (e.g. all) of the caches whose performance is being monitored.

It would be possible in this regard to track the usage of the cache line tags for all the line allocations in the cache, but in an embodiment the reallocation is monitored (tracked) for only a subset of the tags, for example, and in an embodiment, by only sending a subset of the cache traffic to the Bloom filter (circuit). This should still be able to indicate whether there is high reallocation rate, as that should be present in any subset of the cache line allocation in the case where there is "high pressure" on the cache. This could be achieved, for example, by performing an initial hash of the tag (e.g., associated with a line allocation) to thereby select a subset of the tags (e.g. memory addresses) to be sent to the Bloom filter (with there then being a further, e.g. hash, to map those tags (e.g. addresses) to the corresponding Bloom filter entries).

Other arrangements for tracking the cache line allocations could be used instead, if desired. For example, the size of the tag array could be doubled, e.g. for a subset of the cache ways, thereby allowing more tags to be "remembered", to facilitate determining whether a given tag has been previously used.

The number of cache lines being filled can equally be measured in any suitable and desired manner. This metric in an embodiment measures and tracks how many cache lines are waiting for data from the memory (hierarchy). In an embodiment it measures and comprises an average of how many cache lines are currently in the process of being line filled.

The cache miss rate can similarly be measured in any suitable and desired manner. In an embodiment, this metric measures (monitors) the number of new (external) memory reads that are being triggered (and so does not count memory reads that are already in progress as "misses"). Where an average of the cache miss rate is being maintained/monitored, that is in an embodiment an average per cache event (e.g. transaction) (or some number of events (transactions) (rather than for a given time period)).

In an embodiment, the cache miss rate monitoring considers a tag lookup causing a cache line allocation as a miss, and the average miss rate is determined by counting overall tag lookups as the denominator, and tag lookups causing an allocation as the numerator.

The monitored cache operation (e.g. cache "pressure" metrics) is used to control the issuing of instructions for execution threads for execution by the execution unit. This can be done in any suitable and desired manner. In an embodiment the number of instructions that are issued, and/or rate at which instructions are issued, for execution for threads is controlled and determined on this basis. In an embodiment, the number of threads for which instructions are issued for execution, and/or the rate at which instructions for threads are issued for execution, is controlled and determined on this basis.

In the case where the data processor and the execution unit are operable to execute programs for groups ("warps") of plural execution threads together, in lockstep, e.g. one instruction at a time, then the controlling of the issuing of instructions for execution threads for execution by the execution unit is in an embodiment performed by controlling the issuing of instructions for thread groups (warps) for execution by the execution unit.

Thus, in an embodiment, the data processor and the execution unit are configured to execute programs for groups of plural execution threads together, and the controlling of the issuing of instructions for execution threads for execution by the execution unit comprises controlling the issuing of instructions for thread groups for execution by the execution unit. In an embodiment, the number of instructions that are issued, and/or rate at which instructions are issued, for thread groups for execution is controlled and determined on this basis. In an embodiment, the number of thread groups for which instructions are issued for execution, and/or the rate at which instructions for thread groups are issued for execution, is controlled and determined on this basis.

In an embodiment, the number of threads/thread groups for which instructions are issued for execution, and/or the rate at which instructions for threads/thread groups are issued for execution, is restricted (throttled) when the cache operation monitoring (cache metric(s)) indicates a particular, in an embodiment selected, in an embodiment predetermined, cache operating condition (operating state). (As will be discussed further below, the particular cache operating condition (cache operating state) which triggers the restriction (throttling) of the issuing of instructions for threads/thread groups for execution is an operating condition (operating state) that is indicative of the cache being in a "high pressure" state (i.e. being or at risk of being thrashed).)

Thus, in an embodiment, the issuing of instructions for at least some threads/thread groups for execution for the program is (temporarily) stopped (stalled) when the cache operation monitoring (cache metrics) indicates a particular, in an embodiment selected, in an embodiment predetermined, cache condition (operating state) (a need to restrict the number of instructions for threads/thread groups being executed (a need to restrict (throttle) the number of threads/thread groups for which instructions are being executed).

The number of threads/thread groups for which instructions are issued for execution, and/or the rate at which instructions for threads/thread groups are issued for execution can be restricted (throttled) in any suitable and desired manner. For example, the number of threads/thread groups for which instructions are issued for execution could be reduced, e.g., and in an embodiment, by no longer issuing instructions (by stalling issuing instructions) for at least some (some but not all) of the threads/thread groups that are currently in flight (and in an embodiment, that is what is done).

In an embodiment, the number of threads/thread groups which instructions are issued for execution (and the rate at which instructions for threads/thread groups are issued for execution) is restricted by (temporarily) stopping (stalling) the issuing of new (additional) threads/thread groups for execution. In this case, new (additional) threads/thread groups will in an embodiment not be issued for execution whilst the "throttle" state is present, but instructions are in an embodiment continued to be issued for execution for some, and in an embodiment for any (for all), threads/thread groups that were already "in flight" at the time that the "throttle" state arose. In this case therefore, there may not be an immediate reduction in the number of threads/thread groups for which instructions are being issued for execution, but it may be assumed that the number of threads/thread groups for which instructions are being issued will progressively decrease (reduce) over time as existing (in flight) threads/thread groups retire (with no new (additional) threads/thread groups being issued).

It would also be possible to use a combination of these techniques when it is desired to restrict (throttle) the issuing instructions for execution threads/thread groups for execution by the execution unit. For example, the issuing instructions for at least some currently in flight threads/thread groups could be stalled (so as to reduce the number of threads/thread groups that are currently "in flight") and further new/additional threads/thread groups could also not be issued whilst the cache is in the particular, "high pressure", "throttle" state.

Other arrangements would, of course, be possible.

In an embodiment, a measure and in an embodiment an average, of the thread/thread group count is maintained, in an embodiment in terms of the number of threads/thread groups that are currently in flight. This measure is in an embodiment determined by incrementing a counter whenever a thread/thread group is spawned (created) and decrementing the counter whenever a thread/thread group is retired, and then tracking (a running average of) that thread/thread group count.

In this case (and generally), in an embodiment, the restricting (e.g. stalling) of the issuing of instructions for threads/thread groups for execution is so as to reduce the "in flight" thread/thread group count (e.g. either by "stalling" in flight threads/thread groups and/or by the effect of in flight threads/thread groups retiring whilst new/additional threads/thread groups are not being issued), e.g., and in an embodiment, until the "in flight" thread/thread group count falls below a particular, in an embodiment selected, e.g. in an embodiment predetermined, (threshold) count. In an embodiment, the issuing of instructions for thread/thread groups for execution is throttled (restricted) until the execution thread/thread group count falls below a particular, in an embodiment selected, e.g. in an embodiment predetermined, target thread/thread group count, at which point the issuing of instructions for thread/thread groups for execution is in an embodiment no longer throttled.

There may, for example, and in an embodiment, be a thread/thread group count "throttle" threshold which when exceeded triggers the throttling (restricting) of the issuing of instructions for threads/thread groups for execution. The issuing of instructions for threads/thread groups for execution could then be resumed once the threads/thread count falls below the "throttle" threshold (and in one embodiment that is the case), or there could be, for example, be a second, lower thread/thread group count "resume" threshold that when fallen below triggers the removal of any throttling (restricting) of the issuing of instructions for threads/thread groups for execution.

The target thread/thread group count(s) (e.g. to trigger and/or remove "throttling") could be considered in terms of (suitable) averages of the count or counts (e.g. an average "in flight" thread/thread group count) if desired. In an embodiment, the instantaneous (i.e. not an average) thread/thread group count is considered and used for this purpose (i.e. the throttling will be set or removed based on the instantaneous thread/thread group count (rather than any "averaged" count (although as discussed herein, an average thread/thread group count may be and is in an embodiment used, at least in part, to determine the threshold "instantaneous" count(s)))).

As will be discussed further below, the thread/thread group count threshold or thresholds are in an embodiment based on the cache "pressure" metrics discussed above. In particular, and as will be discussed further below, the thread/thread group count thresholds are in an embodiment determined (in an embodiment at run time) based on the current state of the cache "pressure" metrics (and thus are in an embodiment updated based on changes in the cache "pressure" metrics). Correspondingly, both a reduction in the cache pressure metrics (thereby permitting an increased thread/thread group count "throttle" threshold), and a reduction in the current thread/thread group count due to a thread/thread group retiring, can result in no longer throttling (restricting) the issuing of instructions for threads/thread groups for execution).

In an embodiment, there is a, in an embodiment selected, in an embodiment predetermined, minimum (in flight) thread/thread group count that is always maintained, i.e. such that even if the cache operating condition (operating state) indicates that the cache is in a "high pressure" state, instructions for threads/thread groups are still issued for execution so as to maintain that minimum (in flight) thread/thread group count at least. Thus there is in an embodiment a minimum thread/thread group count below which the issuing of execution threads/thread groups is not restricted (throttled) further. This is desirable to provide program execution progress even in the case where a cache or caches is at risk of being thrashed.

Any change (e.g. stalling) in the issuing of instructions for execution threads/thread groups for execution could be performed between arbitrary threads/thread groups in a sequence of threads/thread groups to be issued for execution (and in one embodiment that is the case).

However, at least in the case where respective threads/thread groups are grouped together into larger sets of threads/thread groups for execution, such as would be the case, for example, when performing compute shading in a graphics processor, for example in the case of an OpenCL work group, then in an embodiment any change (e.g. stalling) in the issuing of instructions for execution threads/thread groups for execution is performed on a set of threads/thread groups (e.g. compute shading work group) basis (i.e. such that the issuing of the respective sets of threads/thread groups (work groups) is stalled, rather than stalling the issuing of individual threads/thread groups within a set of plural threads/thread groups (work group) that are grouped together for execution purposes).

Thus, in this case, once a given set of thread groups, such as a compute shading work group, has started to be issued for execution, then in an embodiment all of the thread groups within that set of thread groups (work group) are issued for execution without any throttling (stalling), and then the issuing of the next set of thread groups (the next work group) is stalled (if required), until the cache "pressure" has been reduced.

Correspondingly, any throttling (e.g. stalling) of the issuing of threads/thread groups is in an embodiment performed and applied at the boundary between respective sets of thread groups (at work group boundaries).

The Applicants have recognised in this regard that throttling (e.g. stalling) the issue of instructions for threads/thread groups within a given set of plural thread/thread groups (work group) may be undesirable, e.g. due to the potential presence of barriers relating to a given set of plural threads/thread groups (work group).

In this case therefore, it is in an embodiment determined whether issuing a next set of thread groups (work group) to be issued for execution will exceed the desired thread group count, for example, and if so, then the issuing of that set of thread groups (work group) is stalled, until its issuing will no longer exceed the desired thread group count.

Other arrangements would, of course, be possible.

The controlling of the issuing of instructions for threads/thread groups for execution based on the cache operation monitoring (and in particular the throttling of the issuing of instructions for threads/thread groups) can be performed as desired. This is in an embodiment done by the thread manager (the thread management circuit) that generates (spawns) and schedules the execution threads/thread groups for execution. Thus the thread/thread group issuing controller that receives the cache operation "feedback" from the cache operation monitoring is in an embodiment part of the thread manager.

As discussed above, in an embodiment, the throttling (restricting) of the issuing of instructions for threads/thread groups for execution based on the cache operation monitoring comprises controlling the issuing of (new/additional) threads/thread groups for execution based on the cache operation monitoring (and in particular, as discussed above, where appropriate throttling/restricting (and in an embodiment stalling (stopping) the issuing of (new/additional) threads/thread groups for execution (to the execution unit for executing a program)). Thus anan embodiment comprises controlling the issuing of execution threads/thread groups to the execution unit for executing a program.

When restricting (e.g. stalling) the issuing of new (additional) threads/thread groups for execution, it would be possible for threads/thread groups to still be created (spawned) but then not issued for execution, or the threads/thread groups may not be created (spawned) in the first place (while the issuing of new threads/thread groups is to be stalled).

In an embodiment, when the issuing of new/additional threads/thread groups for execution is to be restricted (and in an embodiment stalled), then the creation (spawning) of new threads/thread groups is restricted (and in an embodiment stalled), as that will use less resources.

In another embodiment, the threads/thread groups are still created (spawned), but the issuing of (instructions) for those threads/thread groups for execution is restricted (and in an embodiment stalled). In other words, the threads/thread groups are still created, but the control is performed by not issuing instructions from those threads/thread groups for execution. This will then allow the control mechanism to throttle (e.g. stall) thread execution after it has decided to create a thread (and correspondingly to be able to throttle (e.g. stall) the threads/thread groups through the whole lifetime of the threads/thread groups rather than just at the creation point).

Thus, in an embodiment, the operation in the manner of the technology described herein controls the issuing of instructions for threads/thread groups for execution based on the cache monitoring by controlling the issuing of individual instructions for the threads/thread groups for execution, rather than simply controlling the creation (spawning) of the threads/thread groups.

In such arrangements where threads/thread groups are still created, but instructions are then not issued for execution, the avoiding of the instructions for threads/thread groups being issued for execution can be done in any suitable and desired manner. For example, and in an embodiment, the threads/thread groups could be associated with a flag, such as a pseudo-"dependency" bit, that when set would cause instructions for the threads/thread groups to not be issued for execution (e.g., and in an embodiment, in the same way as other forms of dependency may delay or stop the issuing of instructions for threads/thread groups for execution). This would then allow the threads/thread groups to be created, but then to be stopped "in flight" to avoid cache use.

This may allow the system to throttle and unthrottle the issuing of instructions for threads/thread groups for execution more rapidly than in the case where the creation of threads/thread groups is stalled, but will use more resources for the "stalled" threads/thread groups, as they are still being created. This arrangement may in particular be useful in the case where the operation in the manner of the technology described herein is being applied to one type of (particular) cache only.

As discussed above, in embodiments at least the number of execution threads for which instructions are issued for executing a program is varied based on the monitoring of the operation of the cache during execution of the program for a plurality of threads, and in an embodiment the issuing of instructions for threads/thread groups for execution is throttled (restricted) when the cache operation monitoring indicates that the cache is in a particular cache operation condition (state).

The particular cache operating condition (state) that triggers the throttling (e.g. stalling) in the issuing of instructions for threads/thread groups for execution can be any suitable and desired cache state. It is in an embodiment a state that indicates that thrashing is likely to occur (or is occurring), and/or e.g. that the cache is under "pressure".

A cache being in the particular cache operating condition to trigger a restriction (e.g. stalling) in the issuing of (instructions for) threads/thread groups for execution can be identified in any suitable and desired manner. This is in an embodiment done using the performance metrics for the cache that are being monitored (as discussed above). In an embodiment, each "cache pressure" metric is considered independently (on its own), to determine if that metric is in a "high pressure" state or not.

Thus, in an embodiment, each "cache pressure" metric can be considered to be in a "high pressure" state or a "low pressure" state, for example, and in an embodiment, depending on the current value of that metric (and other conditions and/or metrics for the cache operation, as appropriate). It will then be considered whether the current value for the metric in question corresponds to that metric being in the particular, "high pressure" state or not (indicates that the metric is in the high pressure state or not).

In an embodiment a (and each) metric has an associated threshold that is used to determine whether the metric has entered a particular, "high pressure", state, e.g. and in an embodiment, potentially indicative of a need to restrict (throttle) the issuing of instructions for threads for execution, and, e.g. for example, and in an embodiment, that when exceeded (or met or exceeded) (or fallen below, etc., depending on what the metric measures), will be taken as an indication that the metric has entered a "high pressure" state potentially indicative of a need to restrict (throttle) the issuing of instructions for threads for execution. Thus, in an embodiment, each cache pressure metric that is being monitored will be considered in relation to a threshold for that metric, to determine whether that metric has entered its "high pressure" state or not.

As will be discussed further below, the cache metric thresholds in this regard could be in terms of a value for the metric itself, or in terms of the value of some other parameter (but which can be related back to the state of the metric in question). In the latter case, for example, and in an embodiment, a threshold in terms of a thread/thread group count (number of active threads/thread groups) that would place the metric in question in the high pressure state could be determined (e.g. based on a current measure of the metric in question), and then compared to the current actual number of threads/thread groups that are active (the current thread/thread group count). Other arrangements would, of course, be possible.

The cache pressure metric threshold(s) that are used to determine whether the metric(s) indicate a "high pressure" state or not can be set in any suitable and desired manner. For example, there could be a single, fixed such threshold for a metric that is, e.g. set and predefined, e.g. based on an analysis (benchmarking) of expected and/or observed (cache) performance in the data processor and system in question.

In an embodiment, the "high pressure" thresholds for the cache metrics can be varied in use, for example, and in an embodiment based on current operating conditions of the data processor. For example, there could be an initial, "default", set of metric thresholds that are set, but with those thresholds then being able to be varied in use, e.g. based on particular, and in an embodiment the current, operating conditions of the data processor.

In an embodiment, the cache pressure metric thresholds are based (at least in part) on a measure of the impact a (the) program being executed (and that is using cache) would or could have on the cache.

In this case, the measure of the "impact" a program being executed would have on a cache is in an embodiment a measure of how much data the program will be passing (reading and/or writing) through the cache. This is in an embodiment a measure of how much a single thread/thread group contributes to the working set of the cache or caches that are being monitored.

This could be determined based on the program that is being executed (and any associated state) to thereby estimate how many bytes (e.g. cache lines) of a cache a single thread or thread group executing a program would use. This could be assessed either statically ahead of time (e.g. by the compiler and/or driver) and provided, e.g. via descriptors, or it could be analysed using appropriate performance measures at run time.

In some cases, the impact a program will have on the cache could be based on the number of instructions in the program that will use the cache in question (for example for vertex shaders in graphics processing, it can be assumed that the vertex attributes and positions are unique for every thread, so a count of instructions that use the load/store cache, for example, will provide a measure of the impact that a given execution thread will have on that cache). In other cases, where it may not be known whether different threads will access the same data or not, it could, for example, be initially assumed that all threads will access different data, but with an estimate based on that assumption then being refined at run time.

In all of these cases, the cache performance monitoring and the controlling of the issuing of instructions for threads/thread groups for execution may be, and is in an embodiment, set so as to (try to) avoid the currently in flight threads/thread groups needing to pass more data through the cache than the size of the cache, for example, and in an embodiment, to limit the thread/thread group count such that the amount of data per thread/thread group multiplied by the thread/thread group count (as appropriate) does not exceed the size of the cache in question.

Whether the cache has entered the operating condition (state) to trigger a restriction (e.g. stalling) in the issuing of instructions for threads/thread groups for execution can be determined based on the "state" of the individual metrics in any suitable and desired manner. For example, if any one of the cache performance metrics enters the high pressure state, the issuing of instructions for threads/thread groups could be restricted (e.g. stalled).

In an embodiment, the cache is only considered to be in the "high pressure", "throttle" state when plural, and in an embodiment only when all, of the (plural) performance metrics are in their respective "high pressure" states (e.g. exceeding their respective "throttle" thresholds). This is particularly used where the cache performance metrics being monitored are as set out above.

The Applicants have recognised in this regard that where only one or less than all of the metrics are indicating "high pressure" on the cache, that may not in fact mean that there is a risk of thrashing the cache. For example, even if there is a high tag reallocation rate, if the miss rate is low, the program execution should still be able to proceed (as this is essentially indicating that most of the data being asked for is already in the cache, so there is no need for concern). Similarly, if there is a high miss/refetch rate, but a low line fill rate, that may indicate that the cache is not in fact acting as a bottleneck for program execution progression (the cache is not on the critical path for program execution progression), such that there will in fact be no need to throttle the issuing of threads/thread groups for execution in that case. However, if all the cache pressure metrics are "bad", then the cache is likely to be (or is being) thrashed.

Thus, in an embodiment, a plurality of cache "pressure" metrics are monitored, and the throttling of the issuing of instructions for execution threads/thread groups for execution is only performed when all of the metrics are indicating "high pressure" on the cache.

In an embodiment, in order to determine whether a given cache performance metric is indicating the "high pressure" state or not, a measure of the impact that each thread/thread group is (currently) having on that performance metric of the cache is determined, and then used to determine whether for the current thread/thread group count that metric is in the high pressure state, and/or whether the issuing of new threads/thread groups will cause the performance metric in question to enter the "high pressure" state. In an embodiment, this measure is used to determine a threshold number of execution threads/thread groups above which the cache performance metric in question would be in the "high pressure" state, so as to determine whether for the current thread/thread group count that metric is in the high pressure state, and/or whether issuing (instructions for) another thread/thread group for execution would move that cache metric into the "high pressure" indicating state.

The impact that a thread/thread group has on a particular performance metric may be determined as desired. In an embodiment, this is determined as an (average) "cache pressure" (impact) per thread/thread group (thereby, e.g., indicating the extra "pressure" that another thread/thread group will cause). In an embodiment, the average cache pressure per thread/thread group is based on the (running) average of the cache pressure metric (as discussed above), and a (running) average of the thread/thread group count (an average of the number of threads or thread groups that are in flight at any one time) (issued for execution and not yet retired).

The so-determined cache pressure metric impact per thread/thread group (the "cache pressure" per thread/thread group) is in an embodiment then used together with a, in an embodiment selected, in an embodiment predefined, threshold cache pressure value for the metric in question (which may, for example be hard coded or encoded in a descriptor) to determine a number of threads/thread groups that (based on the currently estimated impact of a thread/thread group on the performance metric in question) will cause that cache pressure metric to be in the "high pressure" state (i.e., and in an embodiment, to determine a "threshold" thread/thread group count that if exceeded will mean that that cache metric in the "high pressure" state).

The current number of threads/thread groups (count) is in an embodiment then compared to the threshold number of threads/thread groups to determine whether for the current thread/thread group count that metric is in the high pressure state, and/or whether issuing another thread/thread group for execution would move the cache metric into the "high pressure" state or not.

Thus in an embodiment, there is a "high pressure" thread/thread group count value (threshold) for a (and for each different) cache performance metric that is being monitored, that is determined based on a measure of the impact that a thread/thread group will have on that performance metric, and that when exceeded (or met or exceeded) will be taken as an indication that the cache performance metric in question is in the "high pressure" state.

In other words, there will be a target thread/thread group count for each different cache performance metric that is being monitored that is indicative of whether that cache performance metric is in the "high pressure" state or not, and it is determined whether for the current thread/thread group count that metric is in the high pressure state, and/or whether the issuing of a new thread/thread group would take the metric into the "high pressure" state (based on a measure of the impact that a thread/thread group has on the cache performance metric in question).

In particular, it is in an embodiment determined whether for the current thread/thread group count any of the cache performance metrics being monitored are in the high pressure state, and/or whether issuing (instructions for) another thread/thread group for execution will cause the "high pressure" thread/thread group count threshold for a (and in an embodiment for each) metric to be exceeded or not, with the issuing of (instructions for) threads/thread groups for execution then being controlled accordingly (e.g., and in an embodiment, to restrict (e.g. stall) the issuing of (instructions for) additional threads/thread groups for execution where a "high pressure" thread/thread group count threshold(s) is being or would be exceeded), e.g., and in an embodiment, until the issuing of (instructions for) additional threads/thread groups for execution would no longer cause the "high pressure" thread/thread group count threshold(s) to be exceeded (e.g., and in an embodiment, because some currently executing threads/thread groups have in the meantime finished executing (e.g. retired) and/or the current operating conditions have otherwise reduced the cache pressure (e.g. per thread/thread group)).

In this case, it would be possible, for example, to restrict/stall the issuing of instructions for threads/thread groups for execution if (whenever) any one of the cache pressure metrics is in or would be caused to enter the "high pressure" state.

In this case where any single cache performance metric exceeding the thread/thread group count threshold causes the issuing of threads/thread groups for execution to be restricted/stalled, then the issuing of threads/thread groups for execution may be restricted/stalled in that case until the current thread/thread group count is lower than the high pressure thread/thread group count threshold for the performance metric in question.

In an embodiment, only if (when) all of the "high pressure" target thread/thread group counts for all of the cache performance metrics being monitored will be/are being exceeded, is the issuing of (instructions for) threads/thread groups for execution then restricted (e.g. stalled).

In this case where all the cache performance metrics have to be above the "high pressure" threshold for the issuing of (instructions for) threads/thread groups for execution to be restricted/stalled, then the issuing of instructions for threads/thread groups for execution could be no longer restricted (e.g. stalled) only once the "high pressure" thread/thread group count threshold for all of the cache performance metrics will no longer be exceeded by the issuing of new threads/thread groups for execution. This may, e.g. be appropriate where all the metrics are time-based.

In an embodiment, once the issuing of (instructions for) threads/thread groups for execution has been restricted (e.g. stalled), the issuing of (instructions for) threads/thread groups for execution is no longer restricted (e.g. stalled) once the "high pressure" thread/thread group count threshold for any one (for only one) of the cache performance metrics is no longer exceeded/will no longer be exceeded by the issuing of (instructions for) additional threads/thread groups for execution.

Looked at another way, in these embodiments, there will be a "maximum" thread/thread group count (a "high pressure" thread/thread group count) determined for each metric, which if exceeded will be indicative of the cache being in the high pressure state for that metric, with, in essence, the highest "high pressure" thread/thread group count of the "high pressure" thread/thread group counts for all the metrics then, in effect, acting as an overall "high pressure" thread/thread group count threshold, which if exceeded will cause throttling of the issuing of (instructions for) threads/thread groups, but when not exceeded will cause any throttling to no longer be applied (to be removed).

In other words, in an embodiment, if any one of the cache performance metrics says that more threads/thread groups is okay, then more threads/thread groups will be issued for execution.

The actual determination of whether the cache is in the "high pressure" state could be performed, e.g., by the cache operation monitoring circuit (in which case it will just provide a "high pressure" indication to the thread issuing controller), or it could, e.g., be performed by the thread issuing controller (in which case the appropriate cache pressure metric values will be provided to the thread issuing controller for use for that purpose).

Where the data processor includes plural different caches that are being monitored in the manner of the technology described herein, then the state of each cache is, as discussed above, in an embodiment monitored separately to the other cache(s). In this case, the issuing of any threads/thread groups for execution could be throttled when any of the caches is determined to be in the "high pressure" state.

However, in an embodiment, it is possible to throttle the issuing of instructions for threads/thread groups based on which particular cache (or caches) is in the "high pressure" state. In this case, the issuing of instructions for threads/thread groups that will use the "high pressure" state cache or caches is in an embodiment throttled, but any threads that will not use that cache or caches are still issued for execution as normal.

To facilitate this, in an embodiment, information about the use of a specific cache or caches by a thread (and threads) can be, and is, provided for the threads, with the issuing of instructions for the threads then being based on that cache usage information and the monitored state of the cache(s). For example, in the case of a graphics processor, it could be indicated for threads whether they will use the texture cache or not. Such cache usage indications could be provided as desired, for example in appropriate meta-data, such as a descriptor, for the program that the threads are to execute.

In this case, if the particular cache is in the high pressure state, threads indicating as using that cache will be throttled, but if other caches are in the high pressure state (and that particular cache isn't), threads that use the particular cache can continue to be issued for execution.

This may be particularly applicable where the data processor has plural execution thread sources, and the thread issuing controller can issue threads for execution from any of the plural thread sources. In this case, if the different thread sources use different caches, then one thread source may still continue to be issued, even if the other thread source needs to be stalled/restricted. This could be the case, e.g., in a graphics processor that has one thread source for fragment shading programs and another, different thread source for other shader programs, such as compute shading programs (e.g. for vertex shading).

It should correspondingly be appreciated in this regard that the execution unit may, as discussed above, at any given time have running (executing) threads that are executing different programs (whether from different thread "sources" or not). Thus the monitoring of the cache operation need not be and may not be in relation to a particular program, but rather is in an embodiment for the cache operation for all of the threads and programs that are (currently) using the cache in question. Correspondingly, the controlling of the issuing of instructions for threads for execution is in an embodiment done for any and all threads and programs (for which that is needed/appropriate) currently being executed/to be issued.

Although it would be possible always to restrict (e.g. stall) the issuing of (instructions for) threads/thread groups for execution whenever a cache is indicated as being in the appropriate "high pressure" state (and in an embodiment that is what is done), the Applicants have recognised that there may be circumstances where even if a cache is in the "high pressure" state and thus being thrashed or at risk of thrashing occurring, it may not always be necessary or desirable to throttle the issuing of (instructions for) threads/thread groups in response. For example, in the case where the cache that is being or at risk of being thrashed is not in practice acting as the bottleneck for thread execution in the system, then it may be unnecessary to throttle the issuing of (instructions for) thread/thread groups on the basis of the cache pressure.

Thus, in an embodiment, the throttling (e.g. stalling) of the issuing of (instructions for) threads/thread groups for execution based on the current operating condition of the cache is also dependent upon one or more other criteria or conditions, and in an such embodiment, the throttling of the issuing of (instructions for) threads/thread groups for execution based on the cache state is in an embodiment only enabled (performed) in the case that the another condition or conditions is met.

In this case, in an embodiment, the condition that "enables" the throttling of the issuing of (instructions for) threads/thread groups for execution based on the cache operating condition is that the processing (functional) unit that is using the cache in question is related to or is acting as a (main) bottleneck for the thread execution processing, with the throttling/stalling of the thread/thread group instruction issuing for execution being performed (only) if the processing/functional unit in question is indicated as being a bottleneck in the system (but if the processing/functional unit is not indicated as being a bottleneck in the system, then the issuing of (instructions for) threads/thread groups for execution is in an embodiment not throttled/stalled, even if the cache is in a "high pressure" state).

To support this operation, the relevant units that use the cache, such as the appropriate accelerator or slave unit, such as a texture unit or load store unit in a graphics processor, are in an embodiment configured to provide feedback (back pressure) to the thread/thread group issuing process (circuit) indicative of their current workload, e.g. and in an embodiment whether they are currently able to accept new threads/thread groups for processing or not, with the issuing of (instructions for) threads/thread groups then being throttled/stored in the event that the unit is indicating that it is the bottleneck (e.g., and in an embodiment, that it is not currently able to accept new threads/thread groups for processing and the corresponding cache is determined to be in the "high pressure" state).

Thus, in an embodiment, a functional unit or units that is using in a cache provides an indication of its current performance (e.g., in an embodiment, whether it is currently able to accept new threads/thread groups for processing), and only if that unit's performance indicates that that unit is acting as a potential bottleneck to the execution thread processing is any cache associated with the unit indicated as being in a "high pressure" state used to throttle (stall) the issuing of (instructions for) threads/thread groups for execution.

This would allow for the situation, for example in the context of graphics processing, where a shader program being executed may have only one texture operation but lots of arithmetic operations, such that the arithmetic processing will be the main bottleneck in the program execution, such that any thrashing of the texture cache should not have significant effect on the program execution progression, such that even if the texture cache is being thrashed, it would not be beneficial to throttle the issuing of threads/thread groups for execution on that basis.

It will be appreciated from the above that in embodiments of the technology described herein at least, the operation in the manner of the technology described herein to monitor the cache performance and control the issuing of (instructions for) threads/thread groups for execution accordingly should provide a relatively stable mechanism for reducing or avoiding cache thrashing. In particular, throttling the issuing of threads/thread groups will have the effect of dynamically reducing the cache performance metrics (i.e. reducing the risk of thrashing), thereby allowing the throttling to be dynamically reduced as it takes effect.

Correspondingly, in an embodiment, when first issuing threads/thread groups for execution for a (new) program being executed, in an embodiment, the threads/thread groups are issued at a lower rate for execution initially so as to try to avoid issuing too many threads/thread groups initially while the cache performance metrics are initially monitored, with the issuing of the threads/thread groups (the thread/thread group count) being increased only (relatively slowly) until the cache performance metrics have stabilised (e.g. successive averages are considered to be suitably stable, e.g. within a particular, in an embodiment selected, in an embodiment predetermined margin of each other). At this point, the threads/thread groups being issued can be progressively increased, e.g., and in an embodiment, more rapidly, e.g., and in an embodiment until the appropriate "high pressure" cache performance metric state is reached.

Correspondingly, in an embodiment, so as to slow the issuing of thread/thread groups initially, the initial, e.g. averages, for the performance metrics that are being monitored are in an embodiment set to a state that is indicative of the "high pressure" cache state, and then allowed to decrease over time (as the initially set, default values are replaced by the values that are actually measured based on the cache performance while the program is being executed). Correspondingly, in the case where a measure of the size (e.g. impact on the cache(s)) of the program being executed is used, that size is in an embodiment initially set to indicate a "large" program, and then, if appropriate, progressively decreased based on the actual program being executed and the measured performance.

As discussed above, it is believed that the technology described herein may have a particular application in the case of graphics processors and graphics processing. In particular, the Applicants have recognised that texture down sample workloads can tend to thrash the texture cache of a graphics processor, such that implementing the technology described herein in relation to the texture cache can improve performance when performing texture down sample workloads significantly. Correspondingly, compute processing heavy workloads, such as tessellation shaders, tend to thrash the load store cache. Again, the Applicants have found that implementing the technology described herein in relation to the load store cache can improve the performance for such low level tessellation workloads significantly.

The result or results generated by executing the program may be used as desired. For example, they may be output, e.g. to memory. In all cases, the result(s) may be used by the data processor and data processing system as generated output. The output that is generated by the data processor can be any suitable and desired useful output, such as in the case of a graphics processor, a render output, such as a frame (image) to be displayed, a texture (in a render-to-texture) operation, etc.

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

Other arrangements would, of course, be possible.

The technology described herein can be used for all forms of output that a data processor (and processing pipeline) may be used to generate. For example, in the case of graphics processing, the graphics processing pipeline may generate frames for display, render to texture outputs, etc. The output data values from the processing are in an embodiment exported to external, e.g. main, memory, for storage and use, such as to a frame buffer for a display.

The technology described herein is applicable to any suitable form or configuration of data processor and data processing system. In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the data processing system and processor can otherwise include any one or more or all of the usual functional units, etc., that data processing systems and processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that, in embodiments, the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in an embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of a graphics processor operable to execute graphics shader programs.

FIG. 1 shows a typical computer graphics processing system.

An application 2, such as a game, executing on a host processor 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 5 that is executed by the graphics processor 3 in the present embodiments in more detail.

The graphics processing pipeline 5 shown in FIG. 2 is a tile based renderer and will thus produce tiles of a render output data array, such as an output frame to be generated.

(In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 5 that are relevant to the operation of the present embodiments. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuits (processing logic), etc., for performing the necessary operation and functions.

As shown in FIG. 2, the graphics processing pipeline 5 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher order representations of the hull, the domain shader 23 performs operations on vertices output by the tessellation stage (similar to a vertex shader), and the geometry shader 24 processes entire primitives such as a triangles, points or lines. These stages together with the vertex shader 20 effectively perform all the necessary fragment frontend operations, such as transformation and lighting operations, and primitive setup, to setup the primitives to be rendered, in response to commands and vertex data provided to the graphics processing pipeline 5.

The rasterisation stage 25 of the graphics processing pipeline 5 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z buffer within the tile buffer 30. (The tile buffer stores colour and depth buffers that store an appropriate colour, etc., or Z value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4x multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 5 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 5 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler 6 to binary code for the target graphics processing pipeline 5. This may include the creation of one or more intermediate representations of the program within the compiler.

The compiler 6 may, e.g., run on the host processor 1 of the data processing system that includes the graphics processor 3. (The compiler 6 may, e.g., be part of the driver 4, with there being a special API call to cause the compiler to run. The compiler execution can thus be part of the draw call preparation done by the driver in response to API calls generated by an application).

However, other arrangements would be possible, such as the compiler running on the same processor as the compiled code, or the compiler being run on a separate processor, such as the program being pre-compiled on a separate system and being distributed in a compiled form.

FIG. 2 shows schematically the operation stages of the graphics processor 3.

FIG. 3 shows functional units of the graphics processor 3 that are used to perform (and thus to act as) various ones of the processing operations and stages of the graphics processing pipeline 5 shown in FIG. 2. (There may be other functional units in the graphics processor 3.)

As shown in FIG. 3, the graphics processor 3 includes a rasteriser 40, a thread spawner 41, a programmable execution unit 42, a varying interpolator 43, a texture mapper 44, a blender 45, and storage in the form of a load/store cache 46 and a texture cache 48 (associated with the texture mapper 44), in communication with memory 47 of the data processing system (there may be other storage, e.g. caches, that is not shown in FIG. 3).

The thread spawner 41 is operable to spawn execution threads for execution by the programmable execution unit 42, e.g. for fragments that it receives from the rasteriser 40.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads. As part of this operation, and as shown in FIG. 3, the execution threads will read data from and write data to memory 47 via a load/store unit (pipeline) 46 that includes a load/store cache 49.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points). The texture values to be used by the texture mapper are loaded from the memory 47 into a texture cache 48, from where they are then used by the texture mapper 44.

The blender 45 operates to blend, e.g., fragment shading results generated by the programmable execution unit 42 with previously generated fragment shader results, such as results that are already stored in the tile buffer and/or the frame buffer.

Figure 4:
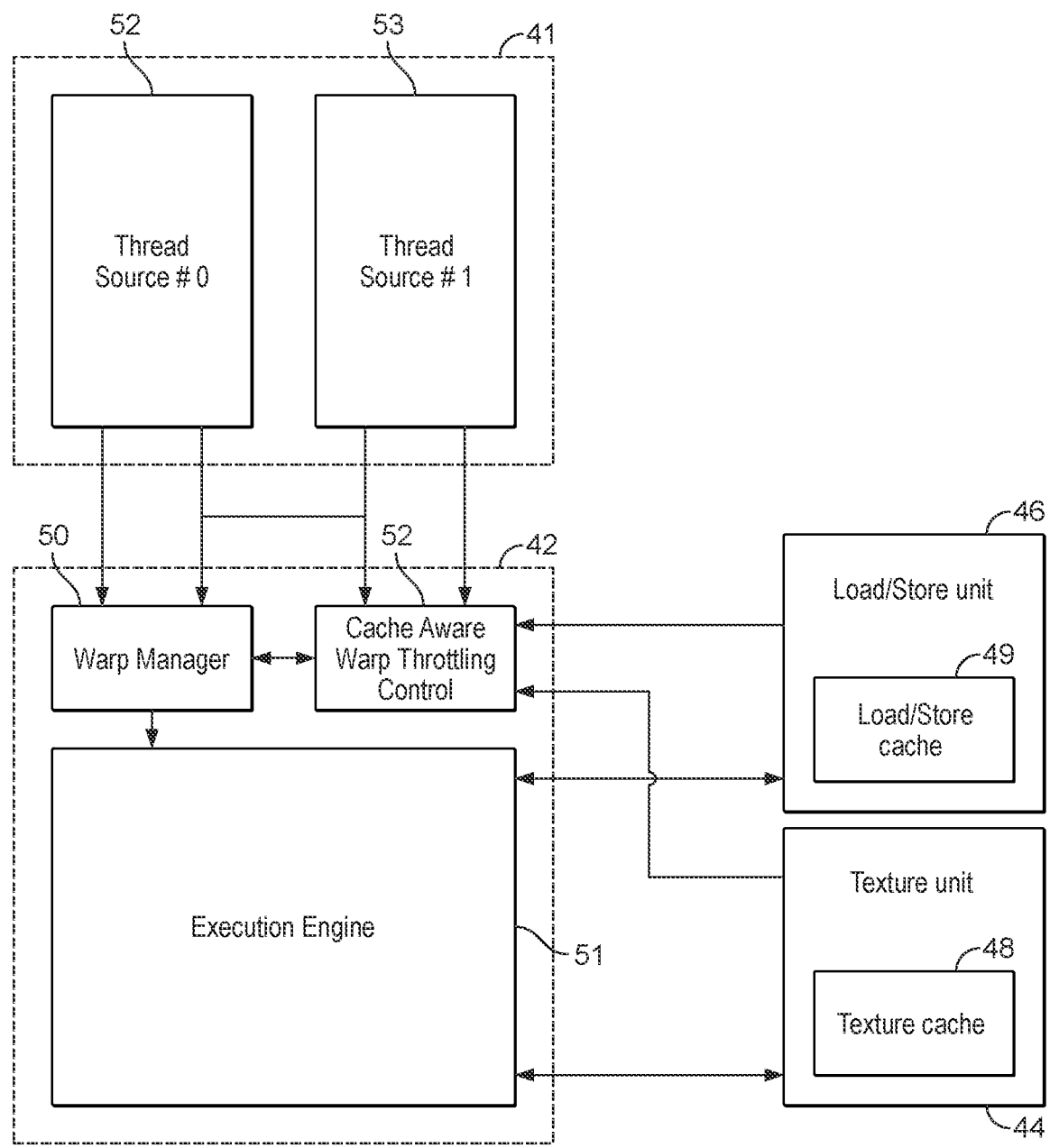
FIG. 4 shows schematically details of the graphics processor of FIG. 3 in an embodiment.

FIG. 4 shows aspects and elements of the graphics processor 3 shown in FIG. 3 that are relevant to the operation of the present embodiments in more detail. In particular, FIG. 4 shows the elements of the graphics processor 3 that are relevant to the control of the issuing of threads to the programmable execution unit 42 for execution based on the current state of the caches (and in particular, in this case, the state of the load store cache 49 of the load store unit 46 and of the texture cache 48 of the texture unit 44) in the present embodiments.

(It will be appreciated that FIGS. 3 and 4 only show those aspects of the graphics processor that are particularly relevant to the operation of the present embodiments. The graphics processor will, of course, include any further and appropriate desired elements, units, circuits, etc., that will be necessary for its operation, and such elements, units, circuits, etc., can be provided and operate in any desired and suitable manner, such as in the normal manner for the graphics processor and graphics processing system in question.)

As shown in more detail in FIG. 4, the programmable execution unit 42 includes, inter alia, a thread group manager circuit 50 that is operable to issue respective thread groups (warps) to the execution engine 51 of the programmable execution unit 42 for execution. (In the present embodiments, it is assumed that respective groups of plural threads (warps) are issued to the execution engine 51 for execution by the thread group manager 50. It would equally be possible for single execution threads to be issued to the execution engine for execution, if desired.)

The execution engine 51 will execute shader programs for the execution threads and thread groups that it receives from the thread group manager 50. The execution engine 51 may, for example, include an arithmetic pipeline that includes, for example, one or more functional units in the form of arithmetic logic units that are operable to perform arithmetic operations on input data values to provide appropriate output data values in response to instructions requiring arithmetic operations in a program being executed by the execution engine 51.

As shown in FIG. 4, the execution engine 51 is also in communication with the load store unit (circuit) (pipeline) 46 that is operable to fetch data values from the main memory 47 for use, for example, by arithmetic units of the execution engine 51, and to write output data values to the main memory 47. For example, the load store unit 46 may load data values into the register file for the execution engine 51, and also write data values from the register file for the execution engine 51 to the main memory 47. To facilitate this, as shown in FIG. 4, the load store unit 46 also includes a load store cache 49 where data values may temporarily be stored after fetching from the memory 47 and/or before writing to the memory 47. The load store unit 46 includes appropriate data fetching and data writing circuits for this purpose (not shown).

The execution engine 51 of the programmable execution unit 42 is also in communication with the texture mapper (texture unit) (circuit) 44 for controlling the texture unit 44 to perform texture mapping operations and for receiving the results of those texture mapping operations. Again, as shown in FIG. 4, the texture mapper (unit) 44 has an associated texture cache 48 for storing texture values locally to the texture mapper 44 for use when performing texture mapping operations. The texture mapper (unit) 44 will include appropriate data fetching circuits for loading texture values from the memory 47 into the texture cache 48 (not shown).

FIG. 4 also shows the thread spawner 41 which provides execution threads for executing by the execution engine 51. The thread group manager 50 will receive execution threads from the thread spawner 41 and organise those threads into respective thread groups for issuing to the execution engine 51 for execution.

As shown in FIG. 4, the thread spawner 41 in this embodiment provides two separate thread sources 52, 53 to the thread group manager 50. One thread source 52 may, for example, be for threads that are to execute fragment shading programs, with the other thread source 53 being for all other (non-fragment shading) threads, such as for threads that are to execute compute shading programs (threads that are to execute a compute shader (e.g. for vertex shading)).

The thread group manager 50 is then operable to select threads from the different thread sources for issuing to the execution engine 51 for execution.

As shown in FIG. 4, the programmable execution unit 42 also includes a "cache aware" thread group throttling control circuit 54. This thread group throttling control circuit operates to cause the thread group manager 50 to throttle (e.g. stall) the issuing of thread groups to the execution engine 51 for execution based on the current operating state of the load store cache 49 and of the texture cache 48, and in particular based on whether those caches are currently at risk of being thrashed or are being thrashed.

To do this, as shown in FIG. 4, the cache aware thread group throttling control circuit 54 receives inputs from the load store unit 46 and the texture unit 44 indicative of the current state of the load/store cache 49 and of the texture cache 48, respectively. It also receives inputs from the thread spawner 41, and in particular from the thread sources 52, 53 indicative of the current threads that are being issued by those sources, and information relating to thread group (warp) create/retire events from the thread group manager 50.

The cache aware thread group throttling control circuit 54 then uses this information to determine whether either of the load store cache 49 or the texture cache 48 are at risk of being thrashed or are currently being thrashed, and, correspondingly, whether the issuing of thread groups to the execution engine 51 should be reduced (stalled) or not, and signals to the thread group manager 50 to control the issuing of thread groups to the execution engine 51 accordingly.

This operation of the cache aware thread group throttling control circuit 54 will now be discussed in more detail with reference to FIGS. 5 and 6.

Figure 5:
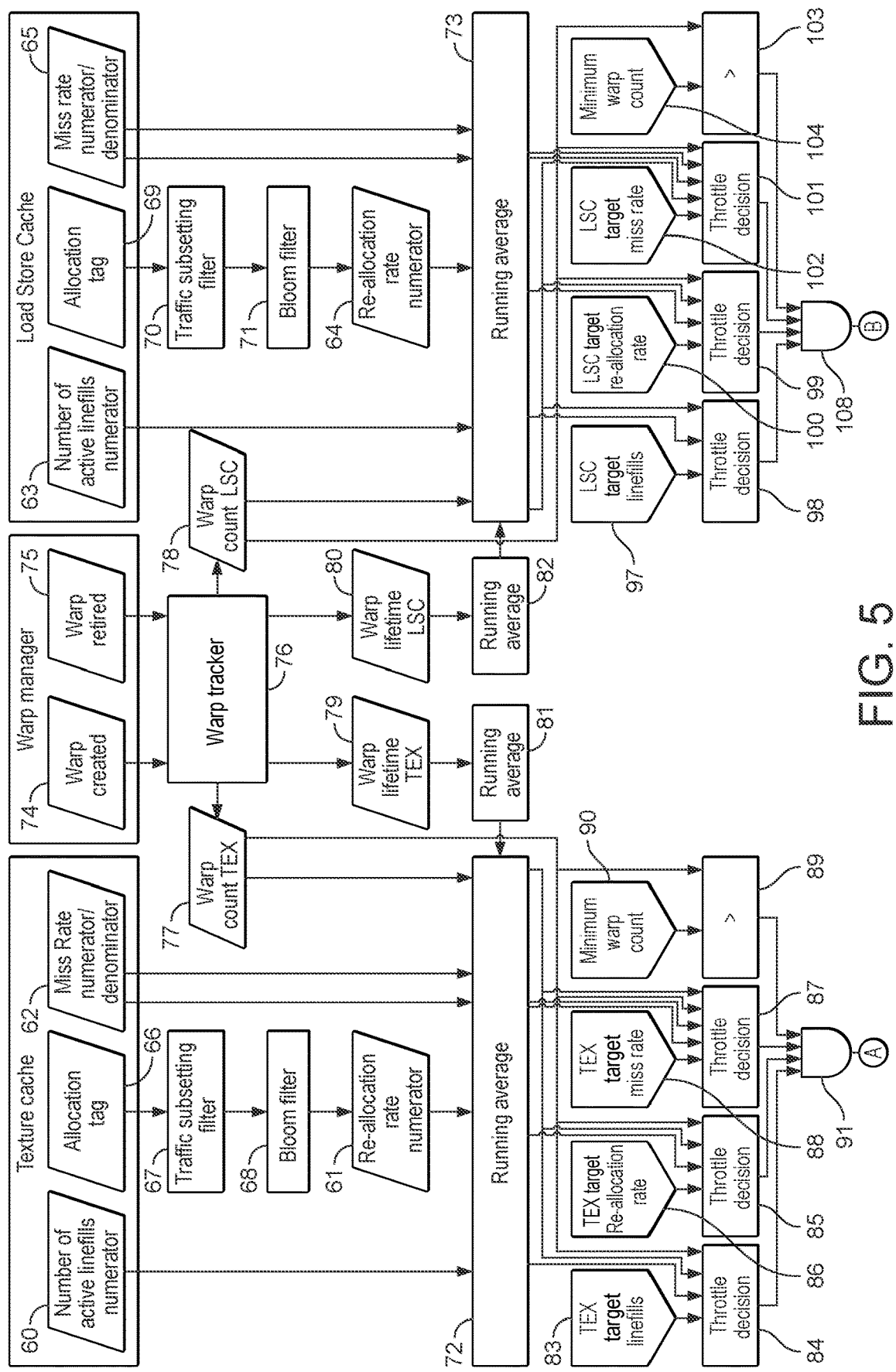
FIG. 5 shows schematically the operation of a graphics processor in an embodiment.
Figure 5:
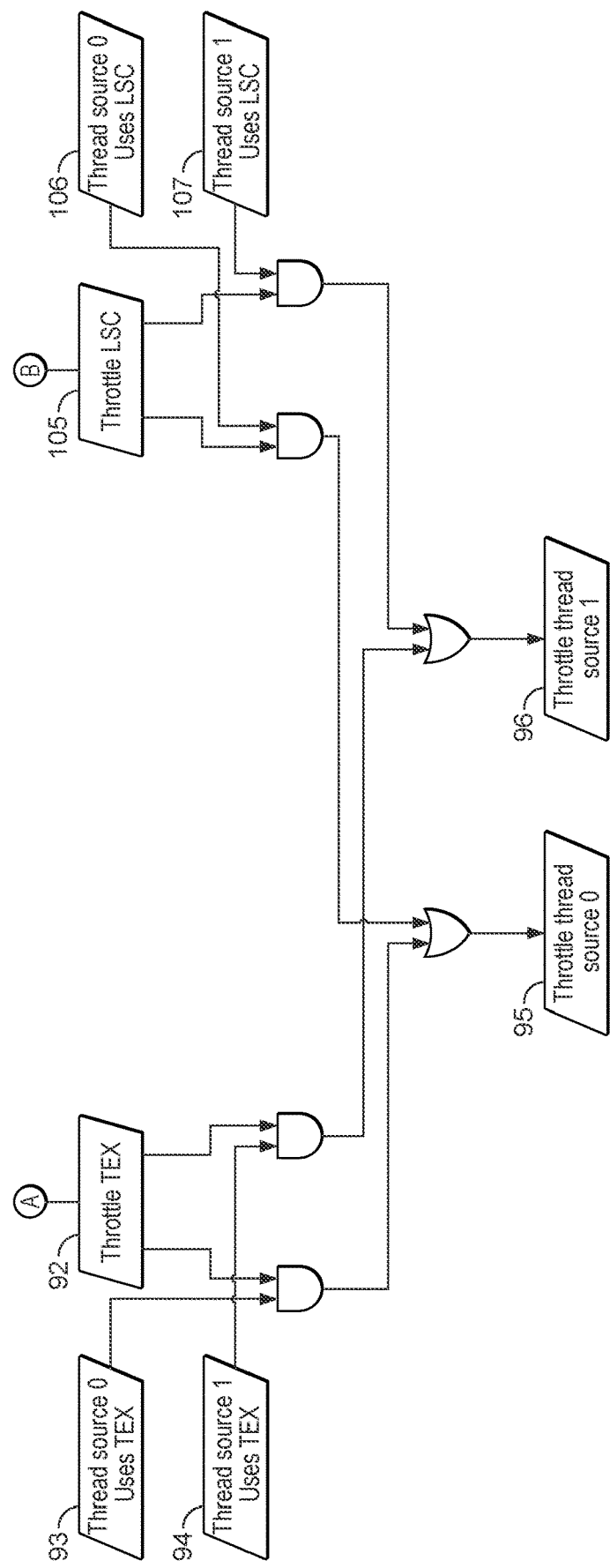

FIG. 5 shows in more detail the operation of the cache aware thread group throttling control circuit 54.

As shown in FIG. 5, the cache aware thread group throttling control circuit 54 maintains a running average of three cache operating condition metrics, which are essentially a measure of the "pressure" that is on the cache in question, namely the number of active line fills, a tag reallocation rate (how often the same tag (e.g. memory address) is fetched into the cache), and a miss rate, for each of the texture cache and the load store cache). For each cache, a running average 72, 73 is maintained for each of these cache pressure metrics, as shown in FIG. 5.

Thus, as shown in FIG. 5, the cache aware thread group throttling control circuit 54 maintains a running average of the number of active line fills 60, a running average of the tag reallocation rate 61 and a running average of the miss rate 62 for the texture cache 48, and correspondingly maintains a running average of the number of active line fills 63, of the tag reallocation rate 64, and of the miss rate 65 for the load store cache 49.

For the number of active line fills, an average comprising a temporal average, comprising the average number of active line fills, sampled every clock cycle (or some particular number of cycles) is used. For the miss rate, an average miss rate per cache event (or some number of events (rather than for a given time period)) is used. Also, the cache miss rate metric does not count memory address reads that are already in progress as "misses".

For the cache tag reallocation rate, again an average per cache event (or some number of events) is maintained.

As shown in FIG. 5, the running average of the tag reallocation rate for the caches is determined by keeping track of the tag allocations for a subset of the overall cache tag "address space" for the cache in question, using a Bloom filter.

Thus, as shown in FIG. 5, in respect of the texture cache, the cache aware thread group throttling control circuit 54 receives each cache tag allocation 66 from the texture cache, applies a filter 67 to select a suitable subset of the cache tag allocations, and then uses a Bloom filter 68 to track the tag reallocation rate within that subset of tags to provide a measure of the tag reallocation rate 61 for the texture cache.

Correspondingly, the cache aware thread group throttling control circuit 54 receives the tag allocations 69 from the load store cache, applies a filter 70 to select a subset of those allocations, and then uses a Bloom filter 71 to track the reallocation rate within that subset of the cache tags.

The cache aware thread group throttling control circuit 54 also receives information about the creation 74 of thread groups and about the retirement 75 of thread groups from the thread group manager 50. It uses this information to keep track 76 of the thread groups that are active in the execution engine 51.

In particular, as shown in FIG. 5, the cache aware thread group throttling control circuit 54 uses this information to maintain a current count of active thread groups that are using the texture cache 77 and a current count of active thread groups that are using the load store cache 78, and also to determine a thread group lifetime 79 for thread groups that are using the texture cache and a thread group lifetime 80 for thread groups that are using the load store cache.

The respective thread group lifetimes are then used to determine respective running averages of the thread group lifetime for thread groups that are using the texture cache 81 and for thread groups that are using the load store cache 82.

The averages of the thread group lifetimes are updated periodically, by tracking the average for every $N^{th}$ thread group (with N equal to 32 in the present embodiments, but other tracking periods could be used, if desired). The average thread group lifetime is updated on the thread group retire event for a tracked thread group (so for every $32^{nd}$ thread group in the present embodiment), as follows:

$$updated\_value=(current\_value \times (1.0-filter\_constant))+(incoming\_value \times (filter\_constant))$$

where current_value is the current average thread group lifetime; incoming_value is the lifetime for the thread group that has just retired (and so triggered the update); filter_constant sets the relative weighting that the incoming_value has when determining the updated average thread group lifetime (updated_value); and updated_value is the updated average thread group lifetime.

(As only the most significant bit or bits of the average thread group lifetime is needed, these averages do not have to be calculated with high precision, so determining a running average in this manner is sufficient.)

In the present embodiments, the filter-constant (weighting) for determining the updated average thread group lifetime is set to 0.1. Other values could, of course, be used if desired.

The so-determined average thread group lifetime is then used to set how the running averages of the cache performance (pressure) metrics are determined (and in particular to determine the filter constants (relative weighting) used when determining the running averages of the respective cache pressure metrics).

In particular, the average of a (and each) cache performance (pressure) metric is determined as follows in the present embodiments:

$$updated\_value=(current\_value \times (1.0-filter\_constant))+(incoming\_value \times (filter\_constant))$$

where current_value is the current average of the cache performance metric; incoming_value is the new measure of that metric (when the update is triggered); updated_value is the updated running average for the metric; and filter_constant is a weighting value (as discussed above, essentially to determine what contribution the incoming_value makes to the updated average).

In the present embodiment, the new measure of the metric (when the update is triggered) (incoming_value) is determined as the average of the value of the metric over the cycles since the last determination of the updated running average for the metric (since the last determination of updated_value). (In the present embodiments, the updated running average (updated_value) for a metric is determined every N cycles, such as every 32 cycles).

Thus, in between the "full" updates, a running accumulated total of the metric value is updated every cycle, i.e. every cycle a new accumulated "temporary" metric value is determined:

$$temporary\_metric\_value=temporary\_metric\_value+incoming\_value$$

where incoming_value is the measure of the metric for the cycle in question; and temporary_metric_value is the running accumulated total of the metric values since the last updated average was determined (the accumulated total, temporary_metric_value, is reset to 0 every time a full update is done, and then a new total accumulated for the next sequence of cycles, and so on).

The new measure of the metric (incoming_value) used when updating the running average of the metric (when determining updated_value for the metric) is then determined as the average of the metric value over the cycles since the previous updated running average for the metric was determined, i.e. as temporary_metric_value divided by the number of cycles since the last update (which in the present embodiments will be 32).

In other words, a total of the metric value is accumulated over the cycles between updates, and then the average metric value per cycle is used as the new measure of the metric (incoming_value) when determining the updated running average for the metric, i.e. every N (in the present embodiment every 32) cycles, an updated running average for the metric is determined as follows:

$$updated\_value=(current\_value \times (1.0-filter\_constant))+((temporary\_metric\_value/N) \times (filter\_constant))$$

where N is the number of cycles since the last "update" (and over which the temporary_metric_value has been accumulated).

Once the updated running average has been determined in this way, then the temporary_metric_value is reset to 0, and a new accumulation of that value is determined over the next sequence of cycles until the next updated running average for the metric is determined, and so on.

This reduces the frequency with which the more expensive full average calculation is performed, whilst still capturing how the metric varies between the "full" running average updates.

In the present embodiments, the weighting modifier, filter_constant is in the range 0.01-0.0001, and is determined based on and using the average thread group lifetime (determined as discussed above). In particular, the weighting (filter constant) is determined in the present embodiments as follows:

$$filter\_constant=1.0/(K \times average\_warp\_lifetime)$$

where average_warp_lifetime is the average thread group lifetime for thread groups that are using the cache in question determined as discussed above; and K is a constant.

In the present embodiments, the weighting (filter_constant) is recalculated every N (in the present embodiments every 32) cycles, i.e. at the same frequency as the full updates of the running averages for the metrics are performed. Other arrangements would, of course, be possible.

The effect of these arrangements is then that if the average thread group lifetime is large, it will cause the filter constant to become smaller (closer to 0.0), thereby giving greater weight to the current average value of the cache performance (to current_value), thereby causing the average value to change more slowly. On the other hand, if the average thread group lifetime is small, it will cause the filter constant to become larger, which means that greater weight will be given to the new, "incoming" cache performance metric value when determining the updated average. For example, a thread group lifetime of 1000 cycles, with K=2, will lead to a filter constant of 0.005, whereas a thread group lifetime of 10000 cycles, with K=2, will lead to a filter constant of 0.0005.

The effect of this in the present embodiments is accordingly that the averages of the respective cache pressure metrics are updated more significantly based on the latest metric value for relatively shorter thread group lifetimes as compared to for longer thread group lifetimes. This will then help to avoid excessive oscillation in the averages in the case of relatively longer thread lifetimes, while correspondingly facilitating the averages reaching a steady state in the case of shorter thread lifetimes.

In the present embodiments, the value of K is set differently for the different cache performance metrics, and also in dependence upon how frequently the averages are being updated. A lower value of K is used if the averages are being updated more frequently and vice-versa. A suitable value for K is in the range 0.25 to 32, and K may be restricted, such that it must be a power of 2, for example, so as to simplify the processing, if desired. The value of K could be fixed, e.g. to a value of 2, but in embodiments it can be varied, e.g. at bootup and/or at runtime.

The value of K could be based on the frequency at which the average in question is updated alone (i.e. 32 cycles in the present embodiments) and this is in an embodiment done for the miss rate and the active line fill metrics. However, for the tag reallocation rate the value of K is in an embodiment based on both the update frequency in terms of the number of cycles after which the average for the reallocation rate is updated, and also how much of the cache traffic is sent to the Bloom filter. For example if only ⅓₂ of the traffic is being tracked with the Bloom filter, but the average is being updated every cycle, then it is desirable to adjust the value of K for the reallocation rate so that the average moves more quickly compared to when the Bloom filter is tracking all the cache traffic and the average is being updated every cycle. Correspondingly, if all of the cache traffic is being tracked with the Bloom filter, but the average is only being updated every $32^{nd}$ cycle, then the value of K for the reallocation rate should be set so that the average moves more quickly compared to when you are capturing all traffic and updating the average every cycle.

In the present embodiments, each respective cache performance metric average (and the weighting (filter_constant)) is updated every 32 cycles or cache events (as appropriate), although more frequent or less frequent updating could be performed, if desired.

Other arrangements for tracking and updating the cache performance (pressure) metrics would, of course, be possible.

The cache aware thread group throttling control circuit 54 then uses each respective cache pressure metric together with an appropriate "high pressure indicating" "threshold" (target) for that metric, to determine whether the cache pressure metric in question is in a high pressure state or not.

More particularly, the running average of the relevant cache pressure metric and the running average of the thread group count for the cache in question is used to, in effect, determine the impact that a single thread group will have on the cache pressure metric in question. Effectively, a current average "cache pressure" per thread group (i.e. corresponding to the current average for the cache pressure metric divided by the average thread group count for the cache in question) is determined. This effectively determines the impact that a single thread group will have on the cache pressure metric in question.

Each cache pressure metric has a corresponding threshold value for that metric that if exceeded indicates that that metric is in a "high pressure" state. This threshold cache pressure for the metric in question may be, for example, hard coded, or encoded in a descriptor, and may be based, for example, on performance metrics and benchmarks for the cache and graphics processing system in question.

The threshold cache pressure for a metric is then used together with the determined cache pressure per thread group for the metric to determine a threshold thread group count (corresponding to the threshold cache pressure divided by the cache pressure per thread group) which if exceeded will (be taken to) indicate that the cache pressure metric in question is in a high pressure state. The current (instantaneous) thread group count for the cache in question is then, in effect, compared to that threshold thread group count, and if the current thread group count is greater than or equal to the threshold thread group count, that is taken as an indication that the cache pressure metric in question is in a "high pressure" state. This is done for each of the cache pressure metrics that are being monitored.

In the present embodiments, the threshold comparisons are performed as follows. (It will be appreciated that this arrangement effectively considers an average pressure per thread group, but does not actually determine that parameter per se. This is to reduce the number of divisions that are required.)

In the present embodiments, the operation effectively determines a target thread group count:

$$\text{target\_warp\_count} = T/(M/W\text{avg})$$

where target_warp_count is the threshold thread group count to indicate that the metric in question is in the "high pressure" state; T is a target high pressure value for the metric in question; M is the average value of the metric; and Wavg is the average thread group count.

The issue of instructions for thread groups for execution is then throttled (in the present embodiments by stalling (stopping) the issuing of new (additional) thread groups) if the number of active thread groups is greater than or equal to the so-determined target thread group count, i.e.:

$$\text{is\_throttled} = \text{warps\_active} >= \text{target\_warp\_count}$$

where warps_active is the current number of active thread groups; and target_warp_count is the target thread group count (as discussed above).

In the present embodiments, in order to simplify the processing, the average value for the performance metric, M, is split into its respective numerator and denominator (for example, in the case of the miss rate metric, the numerator will be how many misses have occurred, and the denominator how many lookup events have occurred). Whether or not to throttle (stall) the issuing of instructions for threads/thread groups is then controlled using the metric numerator and denominator as follows:

If current_warp_count×metric_numerator>T×metric_denominator×average_warp_count:
is_throttled=true where current_warp_count is the current count of thread groups in flight; metric_numerator and metric_denominator are the current (running) average of those values for the metric in question; T is the target value for the metric in question; and average_warp_count is the current average thread group count.

Other arrangements would, of course, be possible.

Thus, as shown in FIG. 5, in the case of the texture cache for example, the running average of the number of active line fills for the texture cache is used together with a target texture cache line fill threshold 83 and the current average count 77 of thread groups that are using the texture cache to determine 84 whether the line fill metric is currently in a high pressure state or not.

A corresponding determination 85 is made for the texture cache tag reallocation rate (using a "high pressure" texture cache reallocation rate threshold 86 for the reallocation rate performance metric), and for the texture cache miss rate 87 (using an appropriate texture cache miss rate high pressure threshold 88).

As shown in FIG. 5, as the active line fills denominator will be a constant (the maximum possible number of outstanding line fills) and the refetch rate denominator will always be 1.0, it is only necessary for the average of the numerators for those cache performance metrics to be used for the "high pressure" determinations (whereas for the miss rate, both the numerator and the denominator can vary (the denominator can vary as there may, for example, be more than one cache lookup per cycle)), such that both the running average of the numerator and the running average of the denominator is required for the "miss rate" determination.

As shown in FIG. 5, in addition to determining whether each of the cache performance (pressure) metrics is indicative of a need to throttle the issuing of execution threads to the execution engine for execution in respect of the texture cache, there is also determination 89 made as to whether the current count of thread groups that are using the texture cache is below or would fall below a minimum thread group count 90 for thread groups that will use the texture cache. This is so as to ensure that at least a minimum number of thread groups will still continue to be issued for execution, even if the texture cache is determined to be in a high pressure state.

The results of the "high pressure", "throttle" decisions for the individual cache performance metrics and the comparison with the minimum thread group count are then used together 91 to determine whether the issuing of thread groups that will use the texture cache should be throttled 92 or not.

In the present embodiments, if (and only if) all of the texture cache performance metrics are indicating that the texture cache is in the high pressure state, and the minimum thread group count is being exceeded, is it then determined to throttle the issuing of thread groups that will use the texture cache. Otherwise, the issuing of thread groups that will use the texture cache is not throttled.

When it is determined that the issuing of thread groups that will use the texture cache should be throttled, then the cache aware thread group throttling control circuit 54 determines 93, 94 which of the thread sources is using the texture cache, and issues a command to the thread group manager 50 to throttle 95, 96 the appropriate thread source or sources accordingly. In this way, if only one of the thread sources is using the texture cache, thread groups from the other thread source that is not using the texture cache can still be issued for execution, even when it is determined that the texture cache is being thrashed or at risk of being thrashed.

(To facilitate this operation, in the present embodiments, information about the use of a specific cache or caches by a thread group is provided for the thread groups, for example as appropriate metadata, such as a descriptor, for the program that the thread groups are to execute.)

In response to the "throttle" command, the thread group manager 50 will operate to throttle (restrict) the issuing of thread groups that are to use the texture cache to the execution engine 51 for execution. In the present embodiments, to do this, the thread group manager 50 simply stalls the issuing of new (additional) thread groups (that will use the texture cache) to the execution engine 51 (i.e. does not issue any further thread groups that will use the texture cache to the execution engine 51), until it no longer receives the "throttle" command from the cache aware thread group throttling control circuit 54.

In the present embodiment, when the issuing of thread groups for execution is to be stalled, then the creation of thread groups is stalled. However, it would also be possible for thread groups to still be created, but then instructions not issued for execution for the thread groups, if desired. In this case, each thread group could be associated with a flag, such as a pseudo-"dependency" bit, that when set would cause instructions for the thread group to not be issued for execution. This would then allow the thread groups to be created, but then to be stopped "in flight" to avoid cache use.

(It would also be possible to stall the issuing of instructions for one or more thread groups that are currently in flight when it is desired to throttle the issue of instructions for thread groups because the cache is in the "high pressure" state, as well as or instead of stalling the issuing of additional (new) thread groups for execution, if desired.)

The stalling in the issuing of thread groups for execution is performed between successive thread groups in the sequence of thread groups being issued for execution, except in the case where respective thread groups are grouped together into larger sets of thread groups for execution, such as would be the case, for example, when performing compute shading in a graphics processor, for example in the case of an OpenCL work group. In this latter case, the stalling in the issuing of thread groups for execution is performed and applied at the boundary between respective sets of thread groups (at work group boundaries) (rather than stalling the issuing of individual thread groups within a set of thread groups that are grouped together for execution purposes).

The cache aware thread group throttling control circuit 54 will continue to monitor the cache performance metrics and the minimum thread group count for the texture cache in the above manner, and continue to stall the issuing of new thread groups that use the texture cache for execution while all the texture cache performance metrics are indicating that the texture cache is in the high pressure state and the minimum thread group count is being exceeded.

However, once this monitoring indicates that any single one of the texture cache performance metrics is no longer in the high pressure state, or that the thread group count for the texture cache will be lower than the minimum thread group count, then the cache aware thread group throttling control circuit 54 will determine that the issuing for execution of thread groups that will use the texture cache should no longer be throttled (stalled). In this case, the cache aware thread group throttling control circuit 54 will correspondingly stop the "throttle" command to the thread group manager 50, to thereby cause the issuing for execution of new (additional) thread groups that will use the texture cache to resume.

In response to this, the thread group manager 50 will resume the issuing of (new) thread groups that are to use the texture cache to the execution engine 51 for execution (until it receives a further command from the cache aware thread group throttling control circuit 54 to stall the issuing of thread groups that use the texture cache (and so on)).

As can be seen from FIG. 5, in the present embodiments there is a single "throttle thread source" signal that the cache aware thread group throttling control circuit 54 will assert (e.g. set to 1) whenever the issuing of threads from the source in question should be stalled. Correspondingly, when that throttle thread source signal is not asserted (e.g. set to 0), then the corresponding thread source is not stalled, and so threads (and thread groups) may be spawned (created)

from that source (if there are any thread groups to be spawned from that source, for example). Other arrangements, such as having a positive "resume" thread group issuing command (rather than simply removing the "throttle" command) could be used, if desired.

Thus the cache aware thread group throttling control circuit 54 will operate to control the issuing of thread groups that use the texture cache for execution based on its monitoring of the operating state of the texture cache.

As shown in FIG. 5, the cache aware thread group throttling control circuit 54 operates in a corresponding manner with respect to controlling the issuing of thread groups that will use the load store cache for execution.

Thus as shown in FIG. 5, the running average of the number of active line fills for the load store cache is used together with a target load store cache line fill threshold 97 and the current count 78 of thread groups that are using the load store cache to determine 98 whether the load store cache line fill metric is currently in a high pressure state or not.

A corresponding determination 99 is made for the load store cache tag reallocation rate (using a "high pressure" load store cache reallocation rate threshold 100 for the reallocation rate performance metric), and for the load store cache miss rate 101 (using an appropriate load store cache miss rate high pressure threshold 102).

Again, there is also determination 103 made as to whether the current count of thread groups that are using the load store cache is below or would fall below a minimum thread group count 104 for thread groups that will use the load store cache.

It should be noted in this regard that while the "high pressure" performance metric thresholds and the minimum thread group count for the load store cache may be set to be the same as the "high pressure" performance metric thresholds and minimum thread group count for the texture cache, that is not essential, and the load store cache could have different "high pressure" performance metric thresholds and/or minimum thread group count set for it as compared to the texture cache (or any other cache that is being monitored in the manner of the present embodiments), if desired. In general, there is no need for each cache that is being monitored in the manner of the present embodiments to have the same "high pressure" performance metric thresholds and minimum thread group count, but rather separate sets of such parameters can be determined and set for each different cache that is being monitored.

The results of the "throttle" decisions for the individual cache performance metrics and the comparison with the minimum thread group count are then similarly used together 108 to determine whether the issuing of thread groups that will use the load store cache should be throttled 105 or not.

Again, if (and only if) all of the load store cache performance metrics are indicating that the load store cache is in the high pressure state, and the minimum thread group count is being exceeded, is it then determined to throttle the issuing of thread groups that will use the load store cache. Otherwise, the issuing of thread groups that will use the load store cache is not throttled.

When it is determined that the issuing of thread groups that will use the load store cache should be throttled, then the cache aware thread group throttling control circuit 54 determines 106, 107 which of the thread sources is using the load store cache, and issues a command to the thread group manager 50 to throttle 95, 96 the appropriate thread source or sources accordingly.

In response to the "throttle" command, the thread group manager 50 will operate to stall the issuing of thread groups that are to use the load store cache to the execution engine 51 for execution, until it no longer receives the "throttle" command from the cache aware thread group throttling control circuit 54 (and so on).

Figure 6:
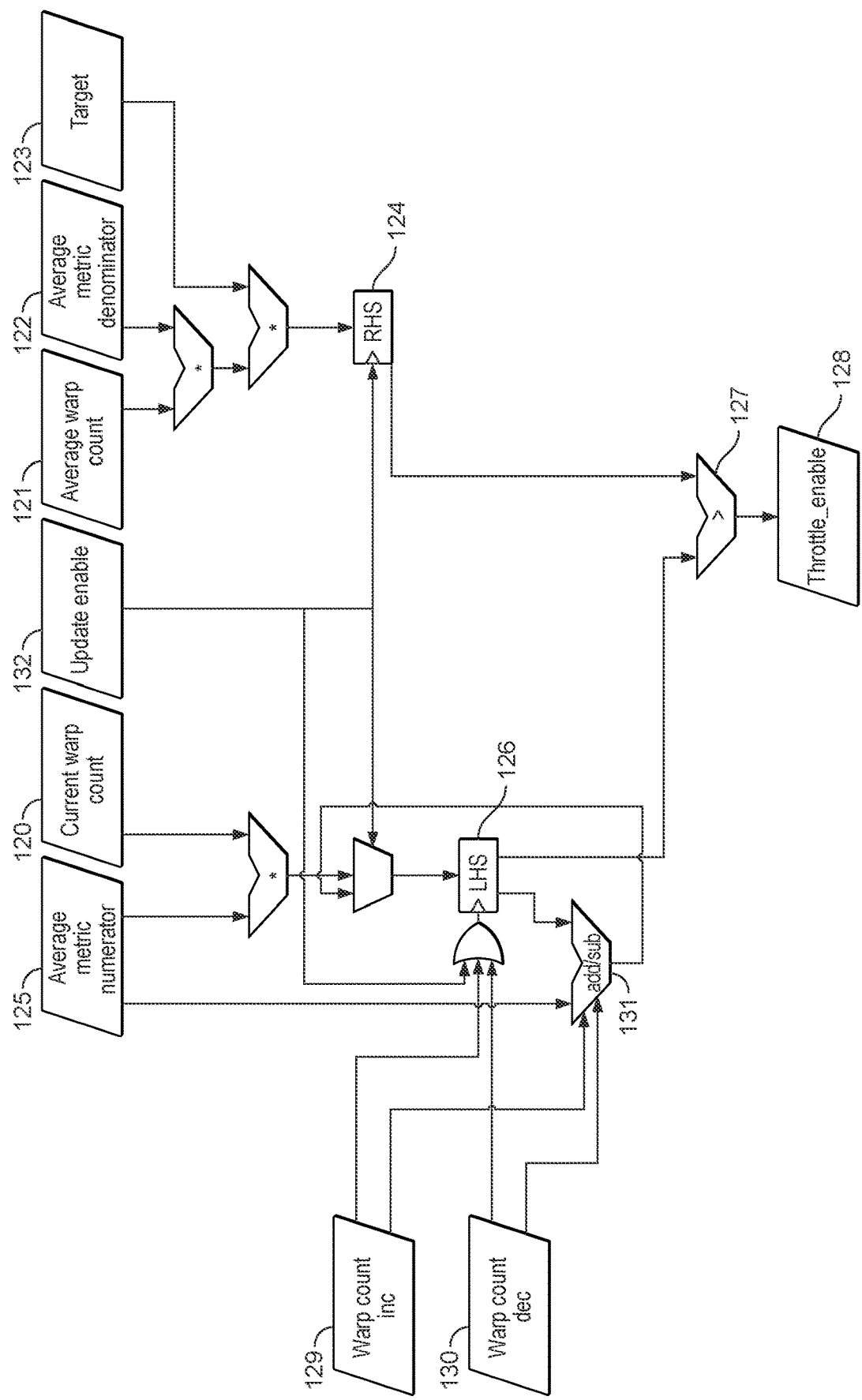
FIG. 6 shows schematically further details of the operation of a graphics processor in an embodiment.

FIG. 6 shows the throttle decision operation performed by the cache aware thread group throttling control circuit 54 in respect of each cache performance metric (as shown in FIG. 5) in more detail.

As discussed above, in the present embodiments in order to simplify the processing, whether or not to throttle the issuing of thread groups is controlled using the metric numerator and denominator as follows:

If current_warp_count×metric_numerator>T×metric_denominator×average_warp_count:
is_throttled=true where current_warp count is the current count of thread groups in flight; metric_numerator and metric_denominator are the current (running) average of those values for the metric in question; T is the (high pressure indicating) target value for the metric in question; and average_warp_count is the current average thread group count.

As shown in FIG. 6, the two sides of this comparison are determined separately, and then compared to determine whether to throttle the issuing of thread groups or not.

Thus, as shown in FIG. 6, the throttle decision circuit determines the "right hand side" (RHS) 124 of the comparison by multiplying the current average thread group count 121 by the denominator 122 for the current average of the metric in question and by a target "high pressure" threshold 123 for the metric and cache in question, i.e. determines:

$$RHS = T \times metric\_denominator \times average\_warp\_count$$

The throttle decision circuit correspondingly determines the "left hand side" (LHS) 126 of the comparison by multiplying the numerator 125 for the average for the metric in question with the current warp count 120, i.e. determines:

$$LHS = current\_warp\_count \times metric\_numerator$$

The "LHS" value 126 is then, as shown in FIG. 6, compared 127 to the "RHS" value 124 and when it exceeds the RHS value 124, a decision to enable throttling 128 in respect of the metric in question is made.

In the present embodiments, rather than doing a "full" update of the determination of the running averages, etc., (and then doing the comparison accordingly) every cycle, the above determinations of the LHS value and the RHS value for this expression are only done every $32^{nd}$ cycle (or every $N^{th}$ cycle, as desired). This is triggered by asserting an update enable signal 132 to trigger the "full" throttle decision calculation every $32^{nd}$ cycle (or every $N^{th}$ cycle, as appropriate). (This allows the frequency at which the "full" throttle decision calculations performed to be controlled, for example so as to avoid them being done too frequently (which may have performance implications).)

Thus in the present embodiments, every $32^{nd}$ cycle the fill RHS and LHS values are determined:

$$RHS = T \times metric\_denominator \times average\_warp\_count$$

$$LHS = current\_warp\_count \times metric\_numerator$$

and compared.

For all other cycles, the right-hand side (RHS) of the comparison is not recalculated, but an updated, less accurate, estimate the left-hand side (LHS) of the comparison is determined from the last fully calculated left-hand side (LHS) value and whether the thread group count has incremented 129 or decremented 130 in the cycle in question. (This is based on the assumption that the numerator for the metric should not change very much since the last full left-hand side (LHS) update, and that the thread group count can only change by 1 per cycle).

Thus in all other cycles, the last full right-hand side (RHS) update 124 is used in the throttle comparison 127, and the left-hand side value for the comparison is determined as:

if the thread group count was incremented:
$LHS=LHS+\text{metric\_numerator}$ if the thread group count was decremented:
$LHS=LHS-\text{metric\_numerator}$.

Thus every $32^{nd}$ cycle (in the present embodiments) there will be full recalculation of the comparison parameters, but in all other cycles the last fully calculated right-hand side expression value together with an estimated update for the left-hand side expression will be used.

It will be appreciated from the above that the technology described herein, in embodiments, comprises a mechanism for reducing or avoiding the thrashing of caches when executing plural execution threads that may all use the same cache. This is achieved, in embodiments of the technology described herein at least, by monitoring the operation of a cache during program execution, and controlling the issuing of instructions for threads for execution based on the current cache operating conditions. In particular, if the current cache operating conditions indicate that the cache is being thrashed or in danger of being thrashed, then the issuing of instructions for threads for execution is restricted, until the cache is no longer in the "high pressure" state.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processor in which execution threads may execute program instructions to perform processing operations, the data processor comprising:
   an execution unit operable to execute instructions in a program to be executed to perform processing operations for execution threads executing the program; and
   a cache operable to store data values for use when executing instructions to perform processing operations for execution threads;
   the method comprising:
   when the execution unit is executing a program comprising a set of one or more instructions for a plurality of execution threads:
   monitoring the operation of the cache during execution of the program for the plurality of execution threads; and
   controlling the issuing of instructions for execution threads of the plurality of execution threads to the execution unit for executing the program based on the monitoring of the operation of the cache during execution of the program for the plurality of execution threads,
   wherein the data processor and the execution unit are configured to execute programs for groups of plural execution threads together, and the controlling of the issuing of instructions for execution threads for execution by the execution unit comprises controlling the number of thread groups for which instructions are issued for execution by the execution unit, comprising stalling the issuing of one or more new thread groups for execution when it is determined that the cache operation monitoring indicates that the cache is in a particular cache operating state, and provided it is determined that the stalling the issuing of one or more thread groups will not cause the number of thread groups to fall below a minimum thread group count.

2. The method of claim 1, wherein the cache is a load/store cache, a texture cache, or a translation lookaside buffer.

3. The method of claim 1, wherein controlling the issuing of instructions for execution threads of the plurality of execution threads to the execution unit for executing the program based on the monitoring of the operation of the cache during execution of the program for the plurality of execution threads comprises:
   restricting the number of execution threads for which instructions are issued to the execution unit for executing the program based on the monitoring of the operation of the cache during execution of the program for the plurality of execution threads.

4. The method of claim 1, comprising monitoring the operation of the cache during execution of the program for the plurality of execution threads by tracking one or more performance metrics that are indicative of the utilisation of the cache.

5. The method of claim 4, comprising tracking one or more of the following performance metrics for the cache: a measure of the cache tag re-allocation rate; a measure of the number of cache lines being filled; and a measure of the miss rate for the cache.

6. The method of claim 4, comprising: determining from the tracking of the one or more performance metrics that are indicative of the utilization of the cache whether the cache is in a particular cache operating state or not.

7. The method of claim 4, comprising determining a running average value for at least one of the one or more performance metrics, and periodically updating the running average value, wherein a weighting used when updating the running average value is based on a measure of the size of a program that the threads are executing, wherein the weighting is relatively smaller for relatively greater size programs.

8. The method of claim 1, wherein the data processor comprises plural different types of caches, and the method comprises:
   monitoring the operation of each of plural different types of caches during execution of the program for the plurality of execution threads; and
   controlling the issuing of instructions for execution threads of the plurality of execution threads to the execution unit for executing programs based on the monitoring of the operation of one or more of the plural caches during execution of programs for the plurality of execution threads and based on which of the plural caches execution threads will use when executing a program.

9. A data processor in which execution threads may execute program instructions to perform processing operations, the data processor comprising:

an execution unit operable to execute instructions in a program to be executed to perform processing operations for execution threads executing the program;

a cache operable to store data values for use when executing instructions to perform processing operations for execution threads;

a cache operation monitoring circuit configured to monitor the operation of the cache during execution of a program for a plurality of execution threads by tracking at least one performance metric that are indicative of the utilisation of the cache, wherein the at least one performance metric has an associated threshold that is used to determine whether the at least one performance metric has entered a particular high pressure cache operating state; and an execution thread issuing controller configured to control the issuing of instructions for execution threads to the execution unit for executing a program based on the monitoring of the operation of the cache during execution of a program by the cache operation monitoring circuit, wherein the data processor and the execution unit are configured to execute programs for groups of plural execution threads together, and the controlling of the issuing of instructions for execution threads for execution by the execution unit comprises controlling the number of thread groups for which instructions are issued, comprising stalling the issuing of new thread groups for execution when the cache operation monitoring indicates that the cache is in the particular high pressure cache operating state, wherein the threshold that is used to determine whether the at least one performance metric has entered a particular high pressure state is varied in use based on a measure of how much data the program will be passing through the cache.

10. The data processor of claim 9, wherein the cache is a load/store cache, a texture cache, or a translation lookaside buffer.

11. The data processor of claim 9, wherein the execution thread issuing controller is configured to control the issuing of instructions for execution threads of the plurality of execution threads to the execution unit for executing the program based on the monitoring of the operation of the cache during execution of the program for the plurality of execution threads by: restricting the number of execution threads for which instructions are issued to the execution unit for executing the program based on the monitoring of the operation of the cache during execution of the program for the plurality of execution threads.

12. The data processor of claim 9, wherein the cache operation monitoring circuit is configured to monitor the operation of the cache during execution of the program for the plurality of execution threads by tracking one or more performance metrics that are indicative of the utilization of the cache.

13. The data processor of claim 12, wherein the cache operation monitoring circuit is configured to track one or more of the following performance metrics for the cache: a measure of the cache tag re-allocation rate; a measure of the number of cache lines being filled; and a measure of the miss rate for the cache.

14. The data processor of claim 9, wherein the execution thread issuing controller is configured to not reduce the issuing of execution threads below a minimum thread count for the cache.

15. The data processor of claim 9, wherein:
the data processor comprises plural different types of caches;
the cache operation monitoring circuit is configured to monitor the operation of each of plural different types of caches during execution of the program for the plurality of execution threads; and
the execution thread issuing controller is configured to control the issuing of instructions for execution threads of the plurality of execution threads to the execution unit for executing programs based on the monitoring of the operation of one or more of the plural caches during execution of programs for the plurality of execution threads and based on which of the plural caches execution threads will use when executing a program.

16. The data processor of claim 9, wherein the data processor is a graphics processor.

17. A method of operating a data processor in which execution threads may execute program instructions to perform processing operations, the data processor comprising:
an execution unit operable to execute instructions in a program to be executed to perform processing operations for execution threads executing the program; and
a cache operable to store data values for use when executing instructions to perform processing operations for execution threads;
the method comprising:
when the execution unit is executing a program comprising a set of one or more instructions for a plurality of execution threads:
monitoring the operation of the cache during execution of the program for the plurality of execution threads by tracking one or more performance metrics that are indicative of the utilization of the cache; and
controlling the issuing of instructions for execution threads of the plurality of execution threads to the execution unit for executing the program based on the monitoring of the operation of the cache during execution of the program for the plurality of execution threads,
the method further comprising:
determining a running average value for at least one of the one or more performance metrics, and periodically updating the running average value, wherein a weighting used when updating the running average value is based on a measure of the size of a program that the threads are executing, wherein the weighting is relatively smaller for relatively greater size programs.

18. The method of claim 1, comprising stalling the issuing of new thread groups for execution until a thread group count falls below a target thread group count, wherein the target thread group count is calculated based on one or more cache performance metrics monitored by the cache operation monitoring.

19. The method of claim 1, comprising monitoring the operation of the cache during execution of the program for the plurality of execution threads by tracking one or more performance metrics that are indicative of the utilization of the cache;
comprising determining a running average value for at least one of the one or more performance metrics, periodically updating the running average value, and between periodic updates for the running average value estimating changes in the running average value based on a change in the number of active threads.

20. The method of claim 1, comprising monitoring the operation of the cache during execution of the program for the plurality of execution threads by tracking at least one performance metric that are indicative of the utilization of the cache, wherein the at least one performance metric has an associated threshold that is used to determine whether the at least one performance metric has entered a particular high pressure state, and wherein when the at least one performance metric is determined to be in the particular high pressure state, the method comprises stalling the issuing of new thread groups for execution, wherein the threshold that is used to determine whether the at least one performance metric has entered a particular high pressure state varies in use based on a measure of how much data the program will be passing through the cache.

* * * * *